Figure 24:
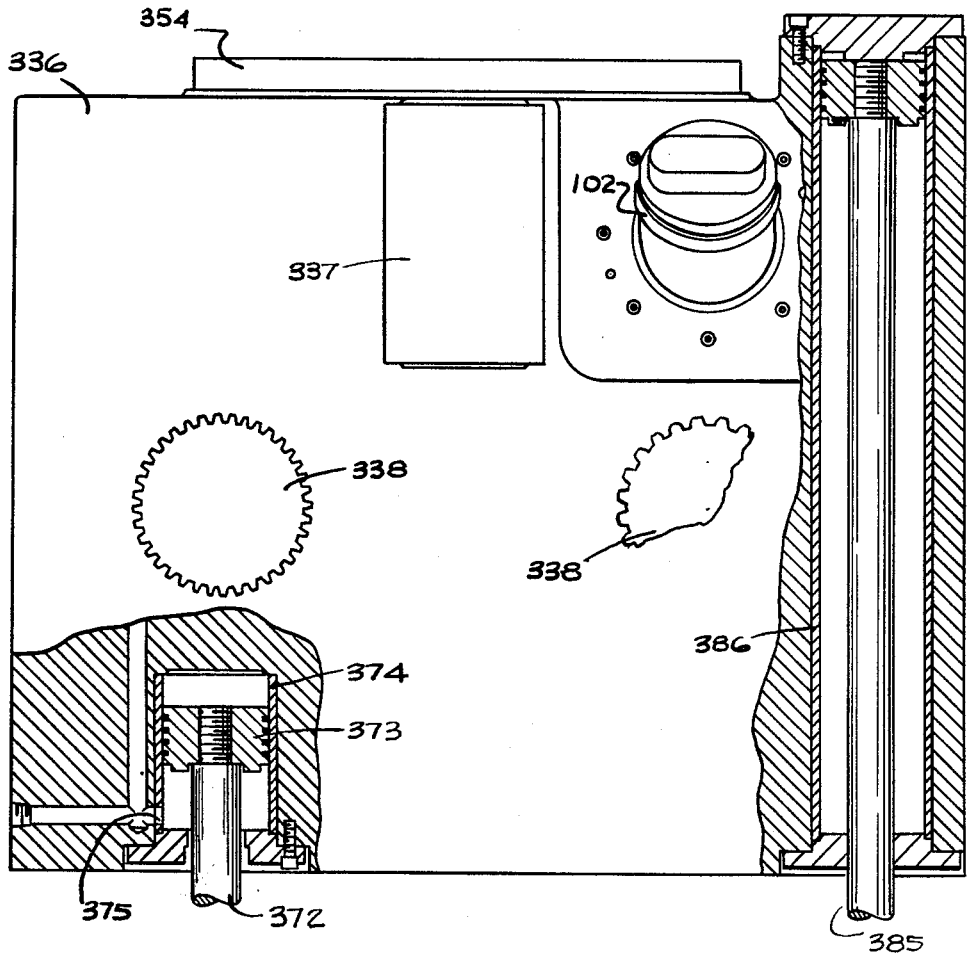

Nov. 24, 1964     A. W. McCUE ETAL     3,158,211
WELL DRILLING APPARATUS
Filed Sept. 16, 1957     25 Sheets-Sheet 1
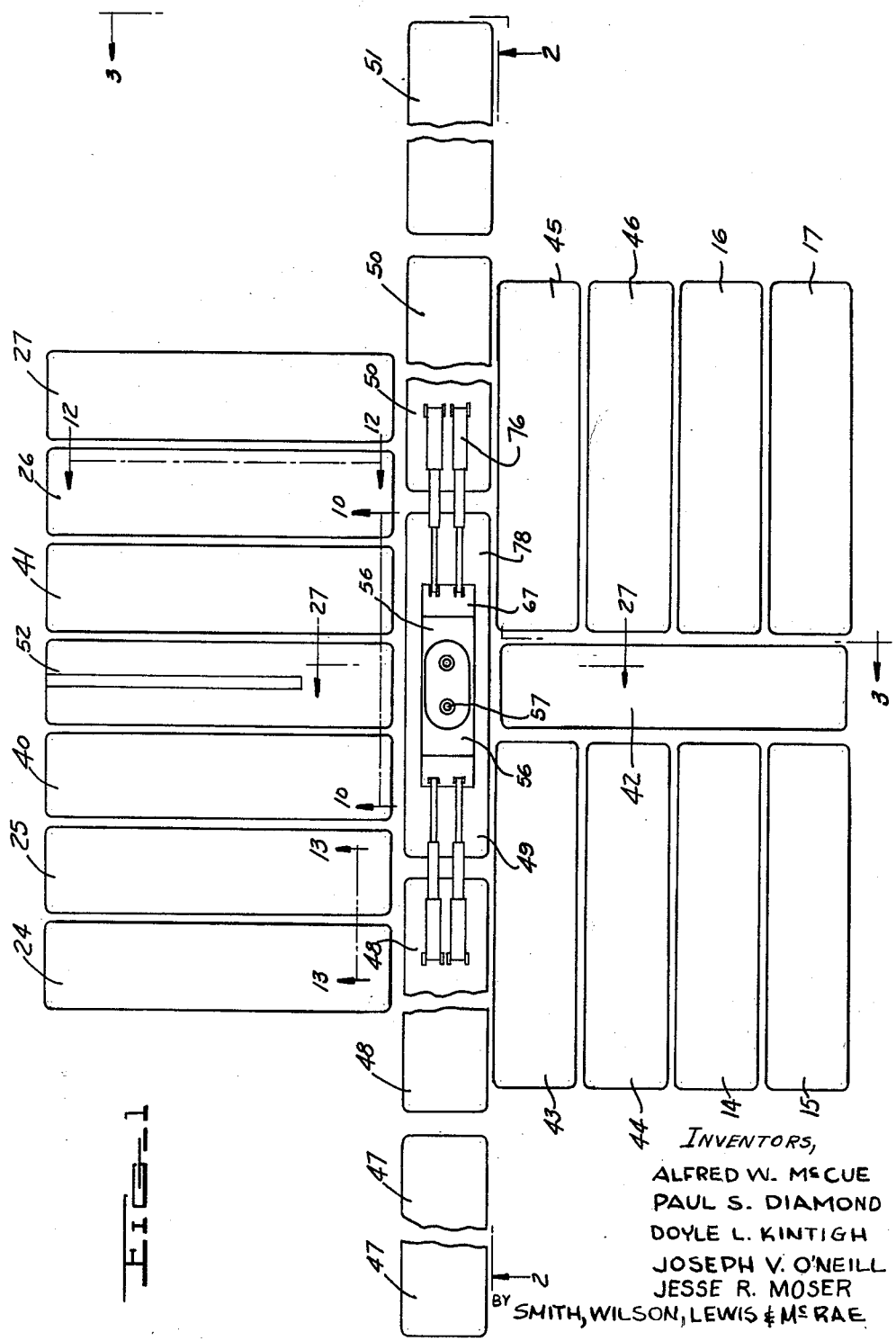
INVENTORS,
ALFRED W. McCUE
PAUL S. DIAMOND
DOYLE L. KINTIGH
JOSEPH V. O'NEILL
JESSE R. MOSER
BY SMITH, WILSON, LEWIS & McRAE

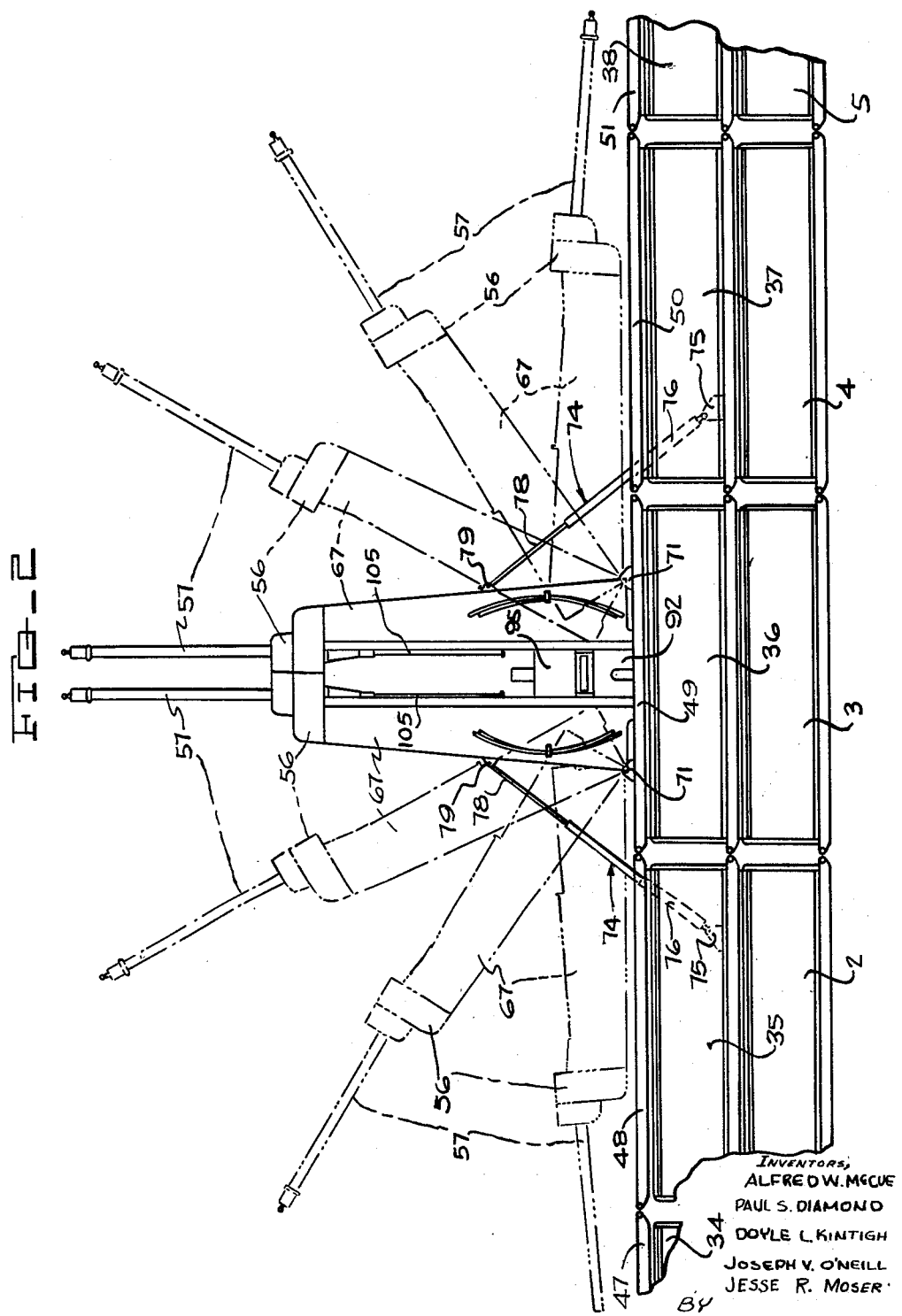

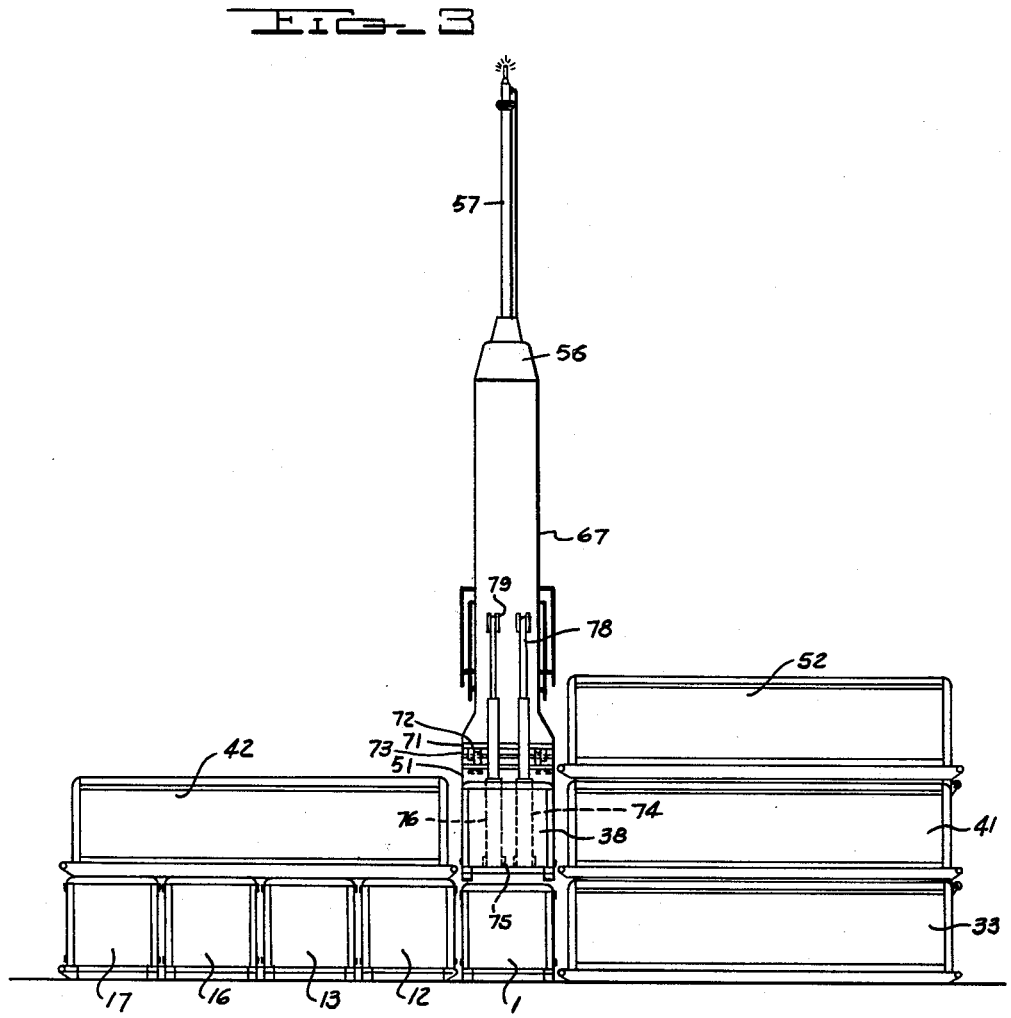

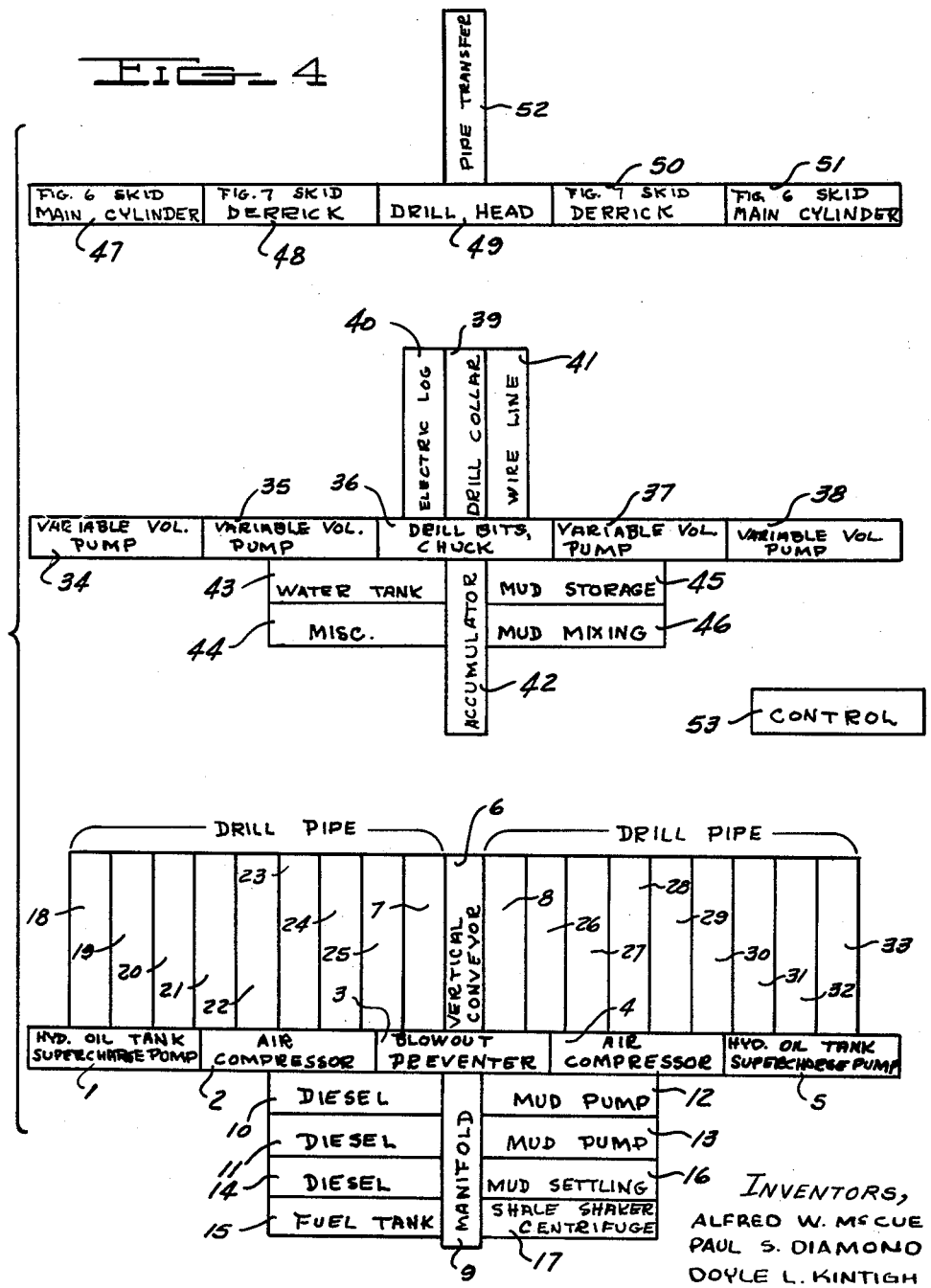

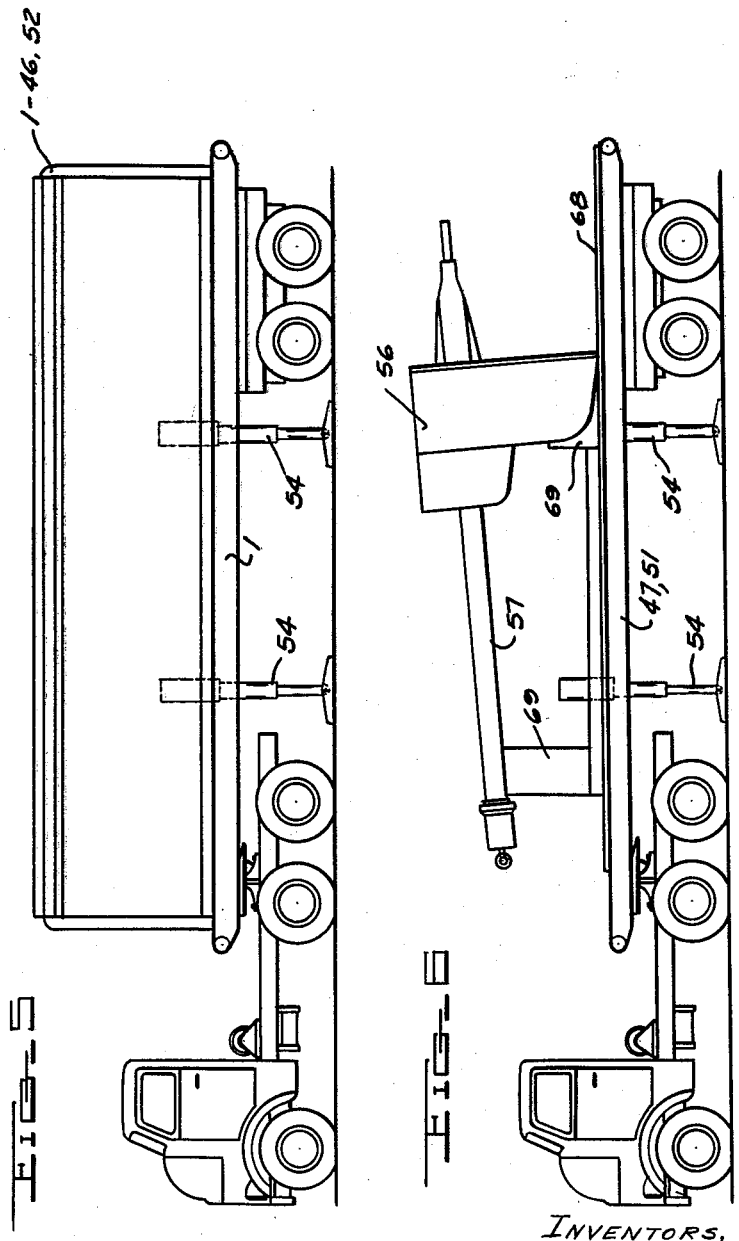

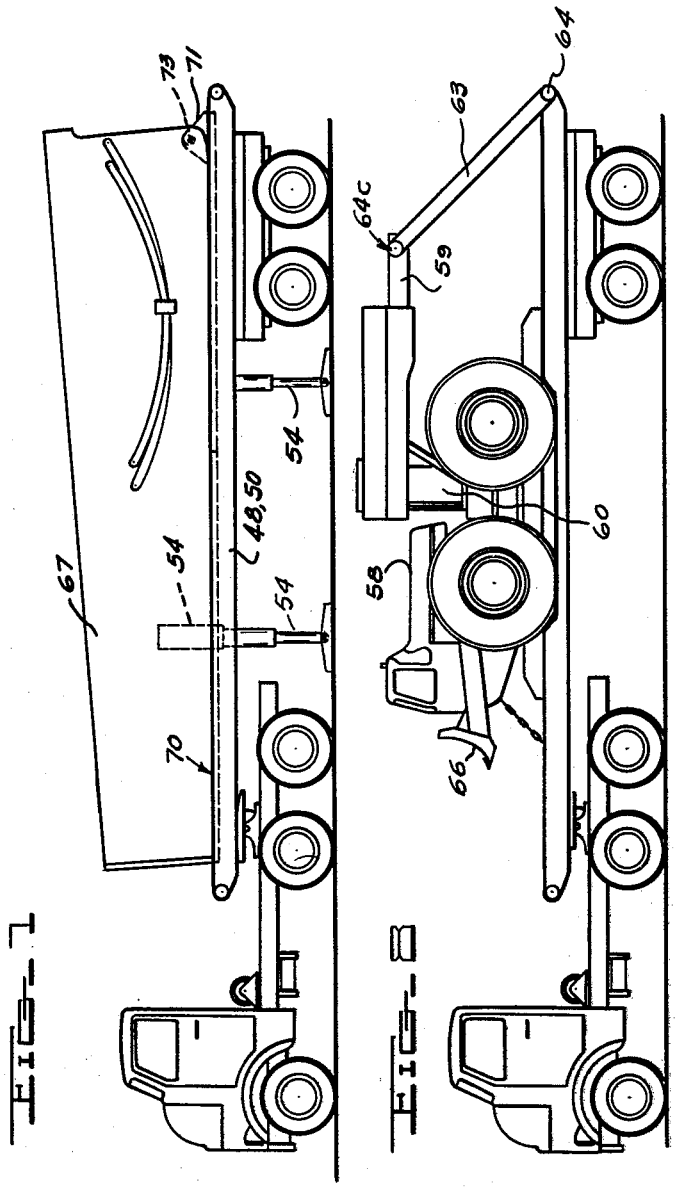

Nov. 24, 1964   A. W. McCUE ETAL   3,158,211
WELL DRILLING APPARATUS
Filed Sept. 16, 1957                              25 Sheets-Sheet 7
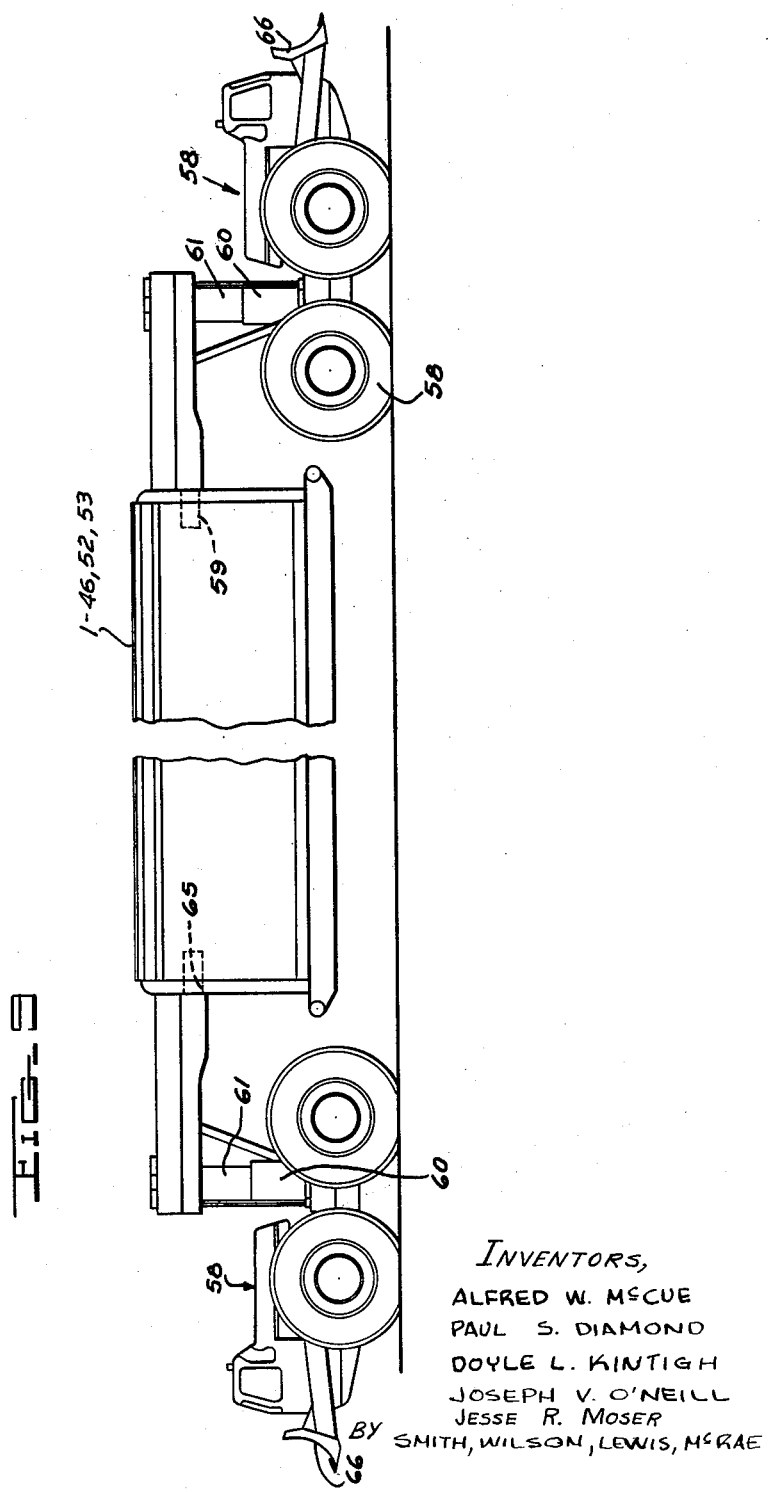
INVENTORS,
ALFRED W. McCUE
PAUL S. DIAMOND
DOYLE L. KINTIGH
JOSEPH V. O'NEILL
JESSE R. MOSER
BY SMITH, WILSON, LEWIS, McRAE

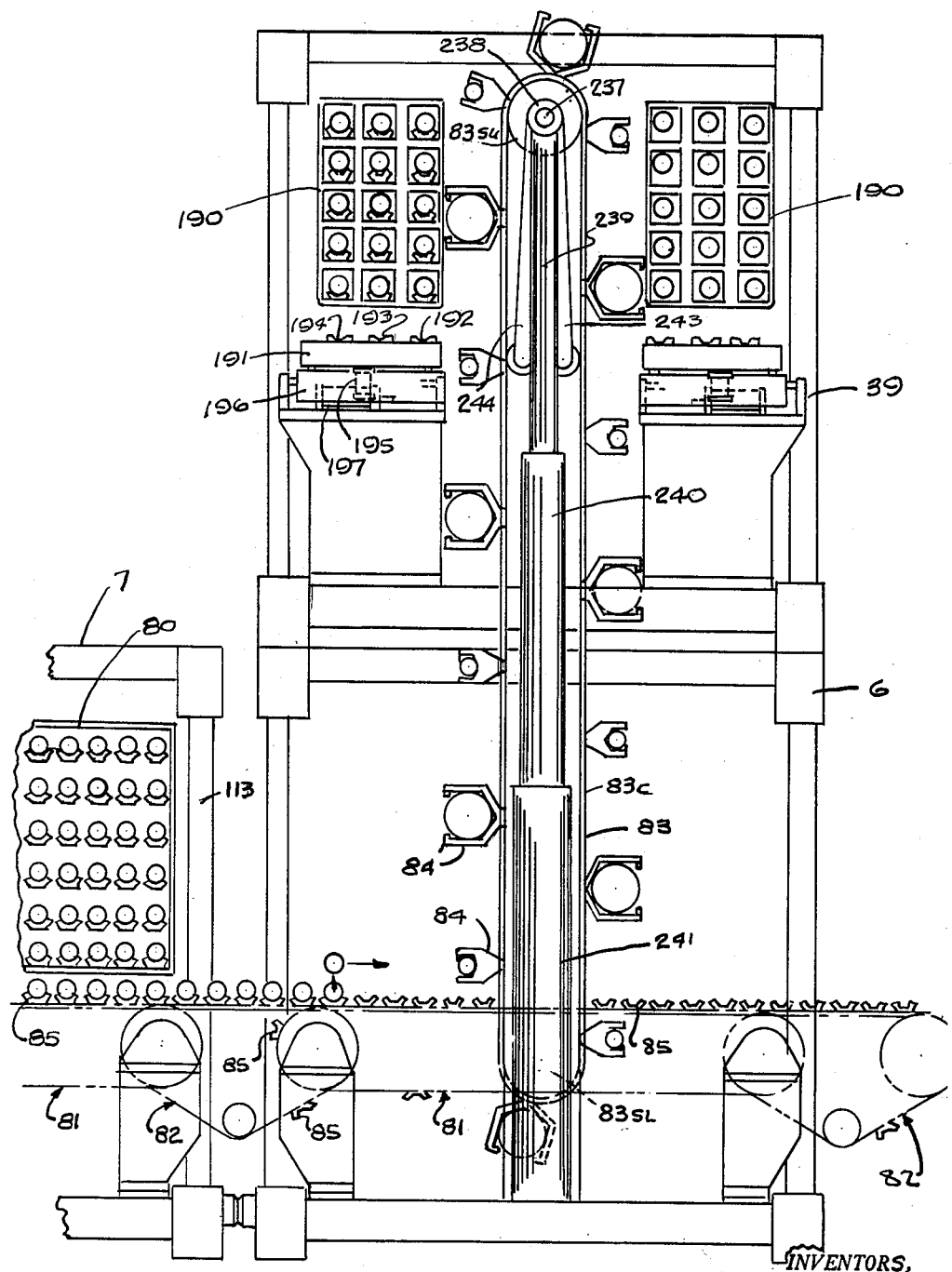

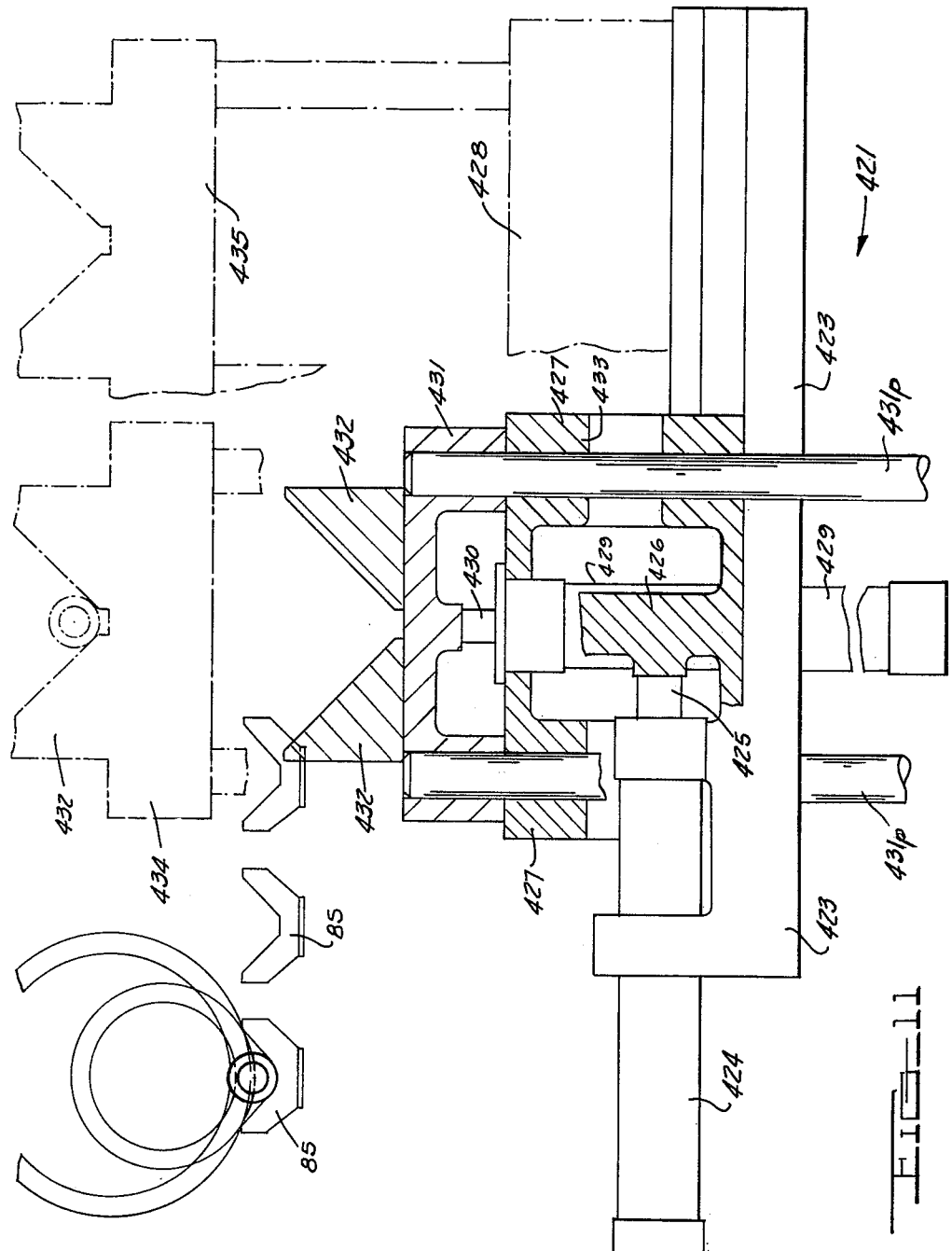

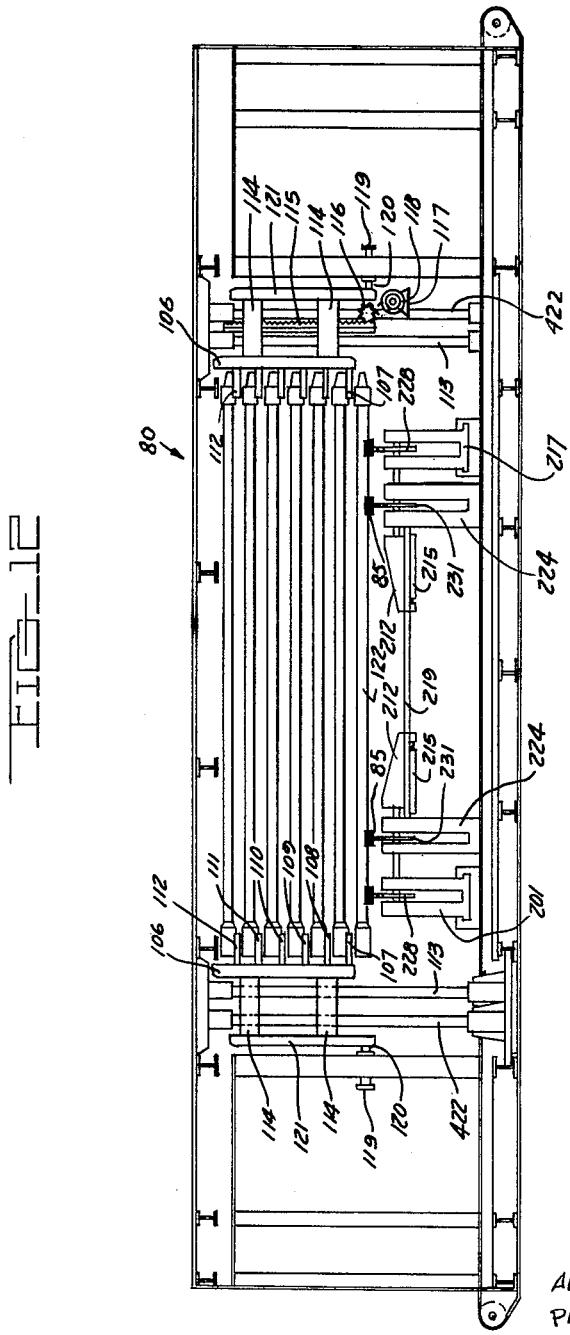

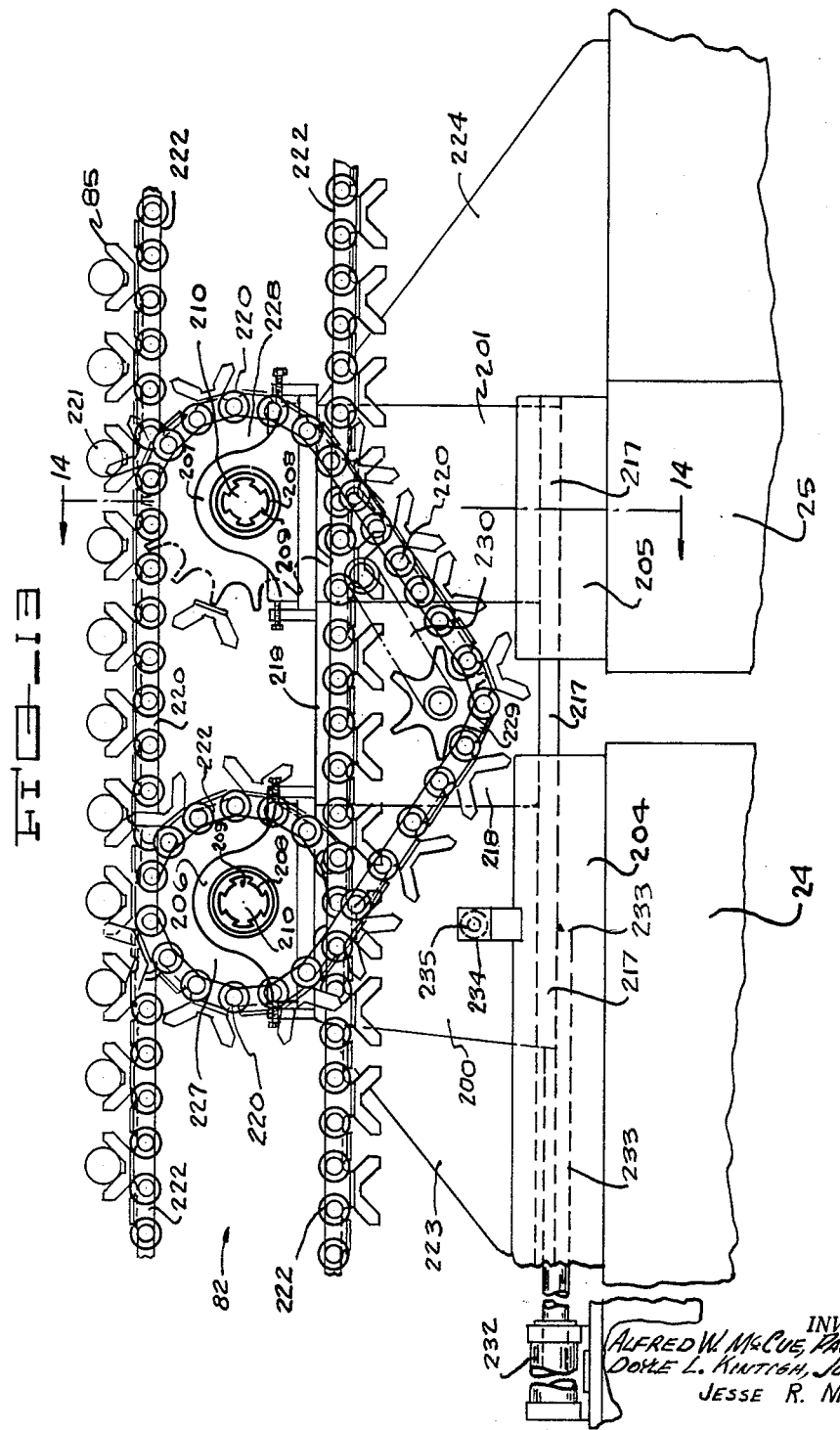

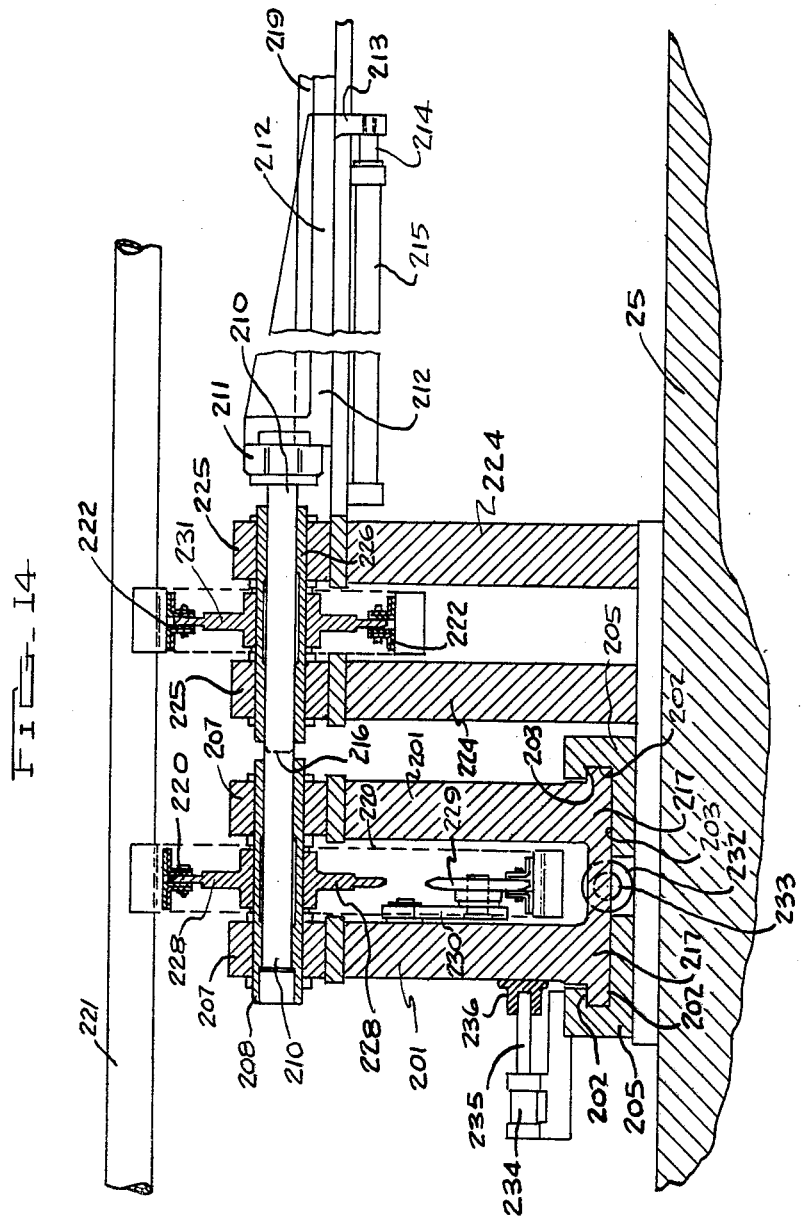

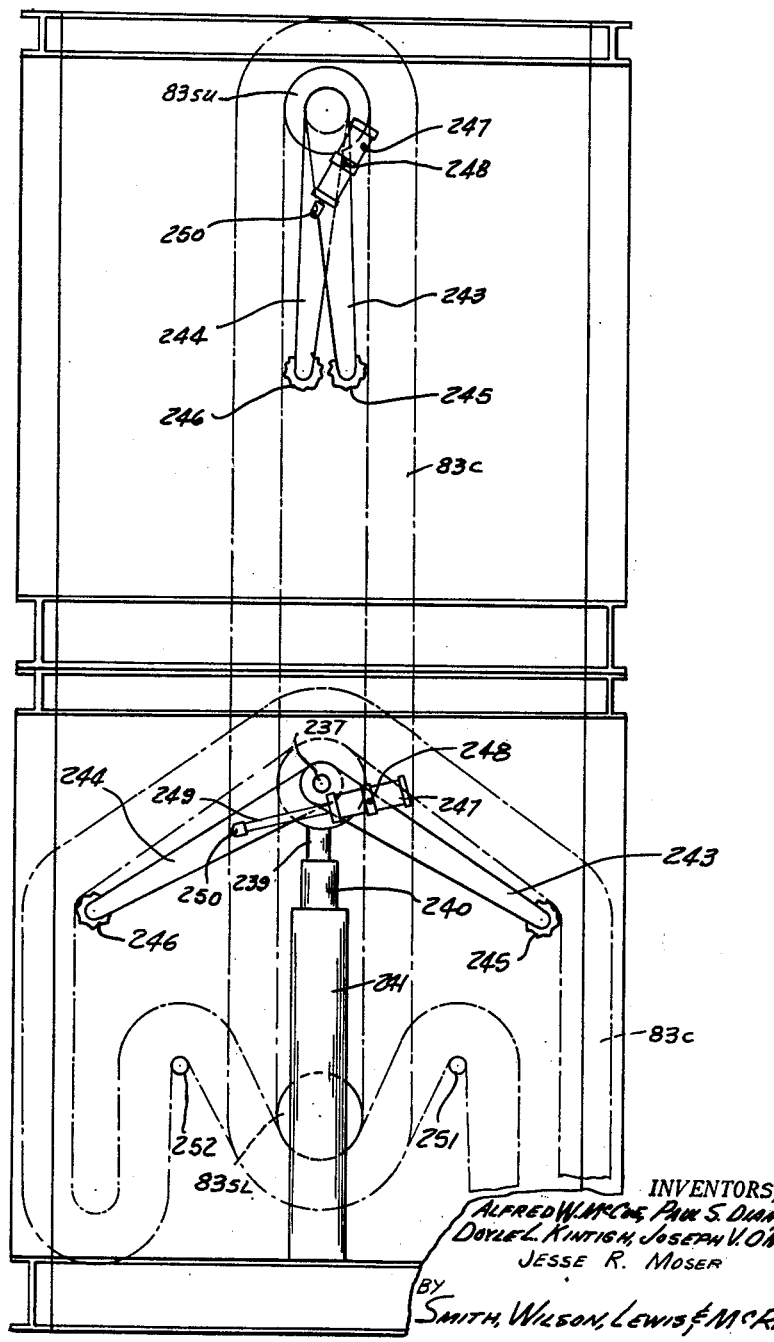

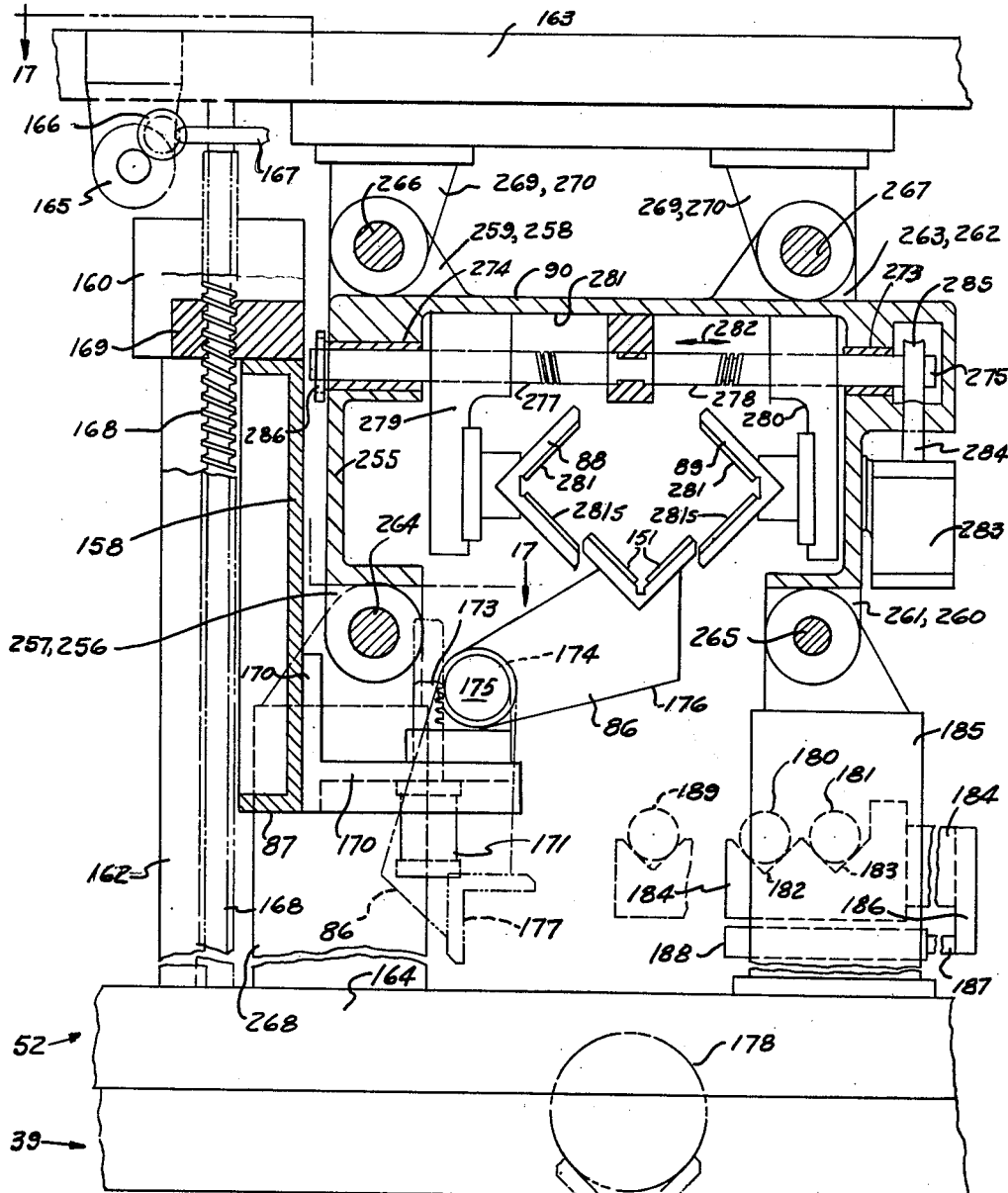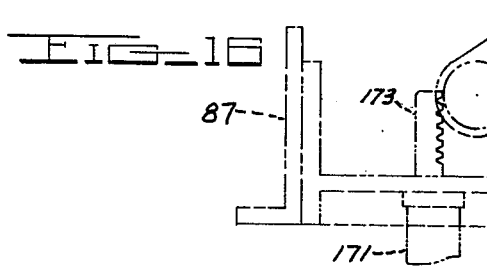

Nov. 24, 1964   A. W. McCUE ETAL   3,158,211
WELL DRILLING APPARATUS
Filed Sept. 16, 1957   25 Sheets-Sheet 15
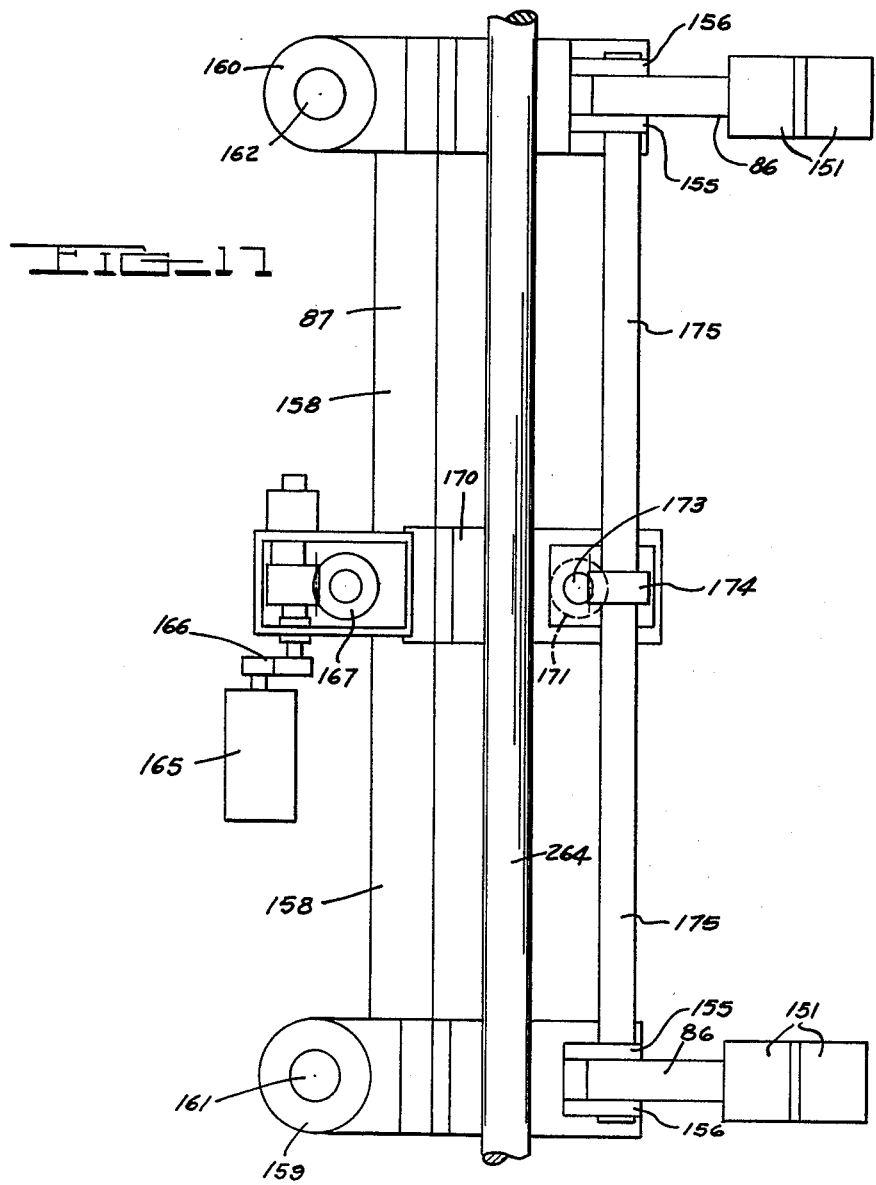
INVENTORS,
ALFRED W. McCUE, PAUL S. DIAMOND
DOYLE L. KINTIGH, JOSEPH V. O'NEILL
JESSE R. MOSER
BY SMITH, WILSON, LEWIS & McRAE

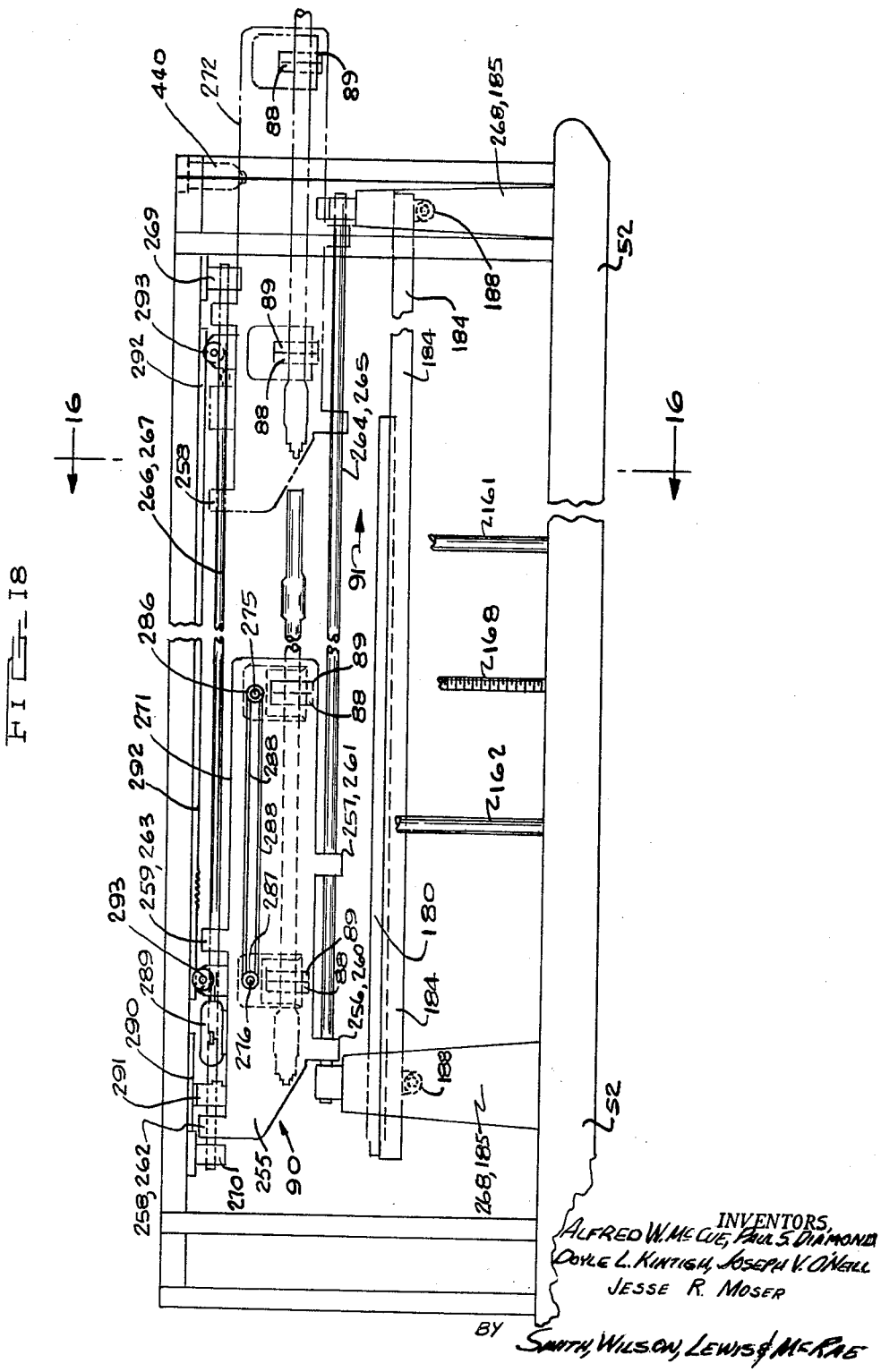

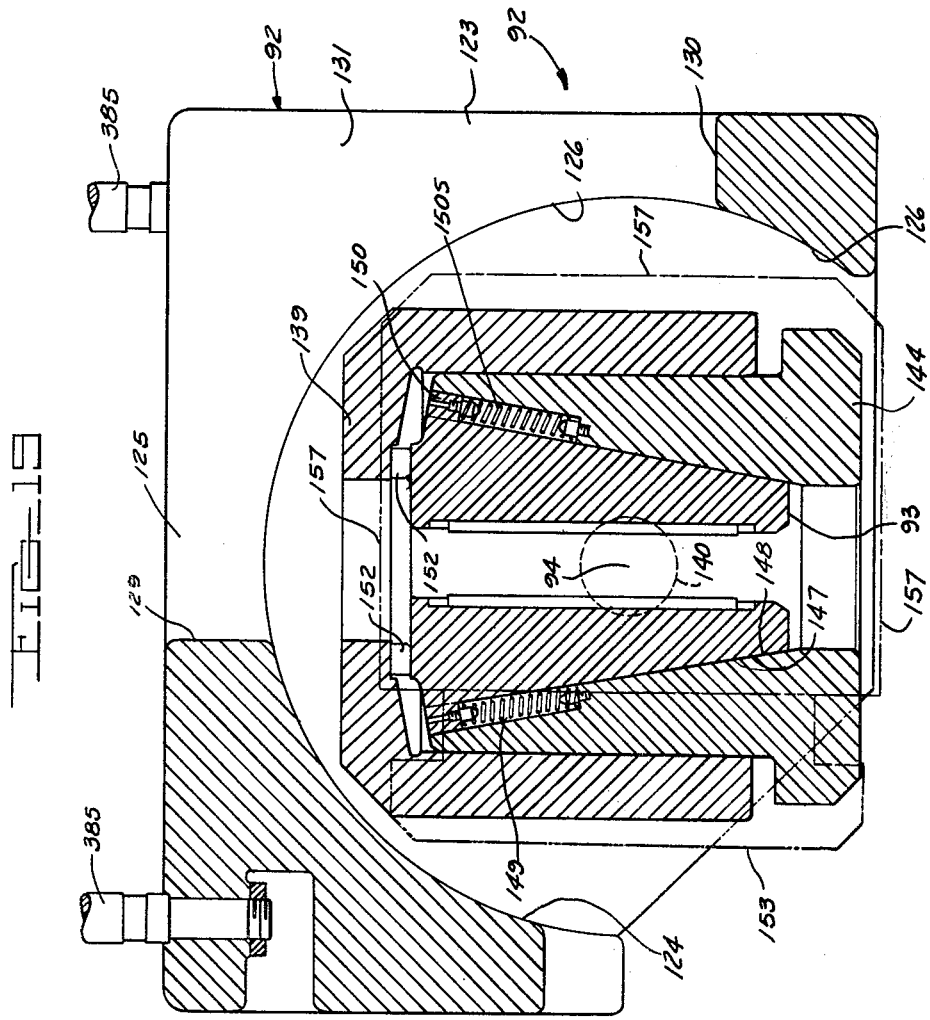

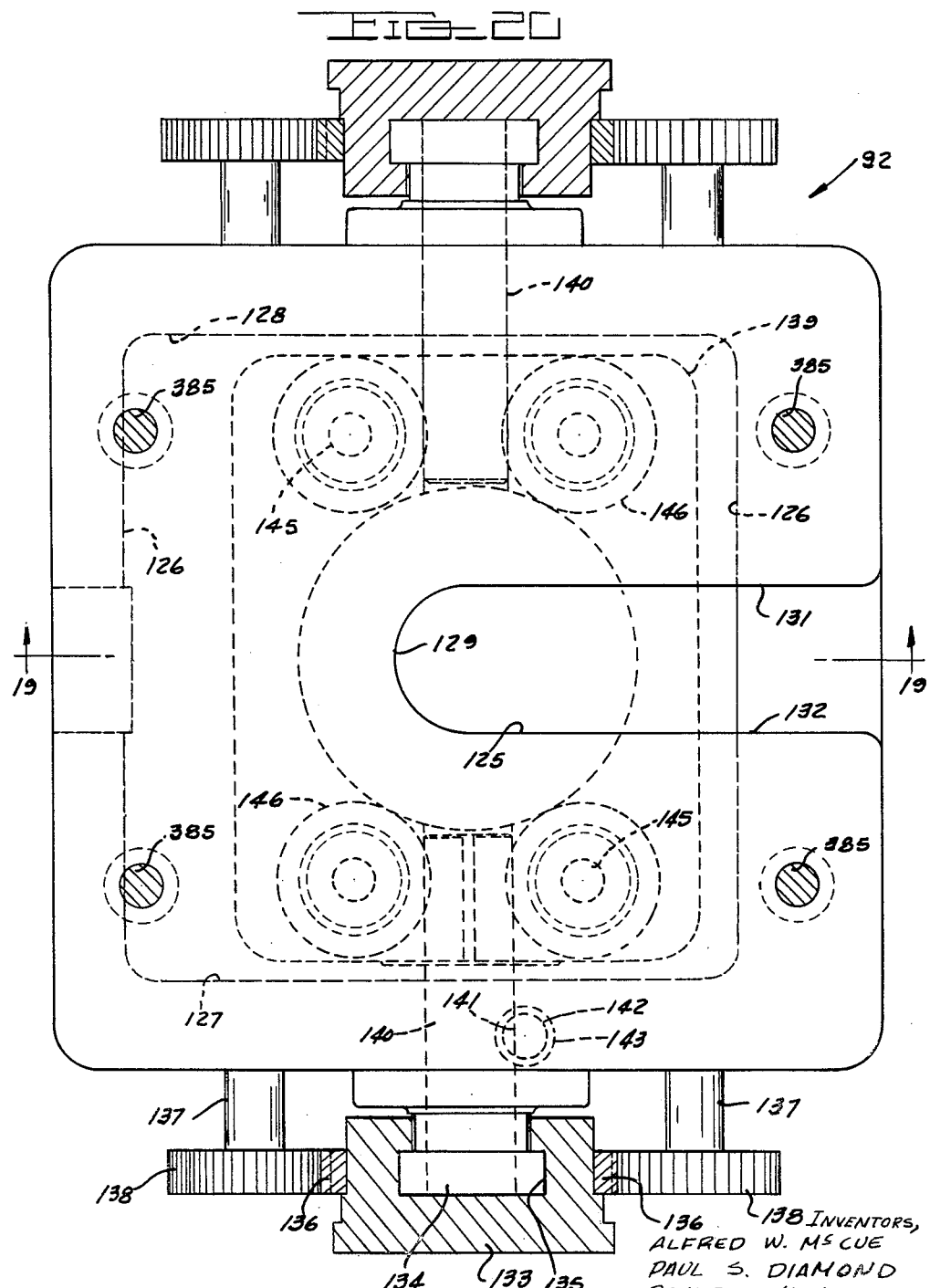

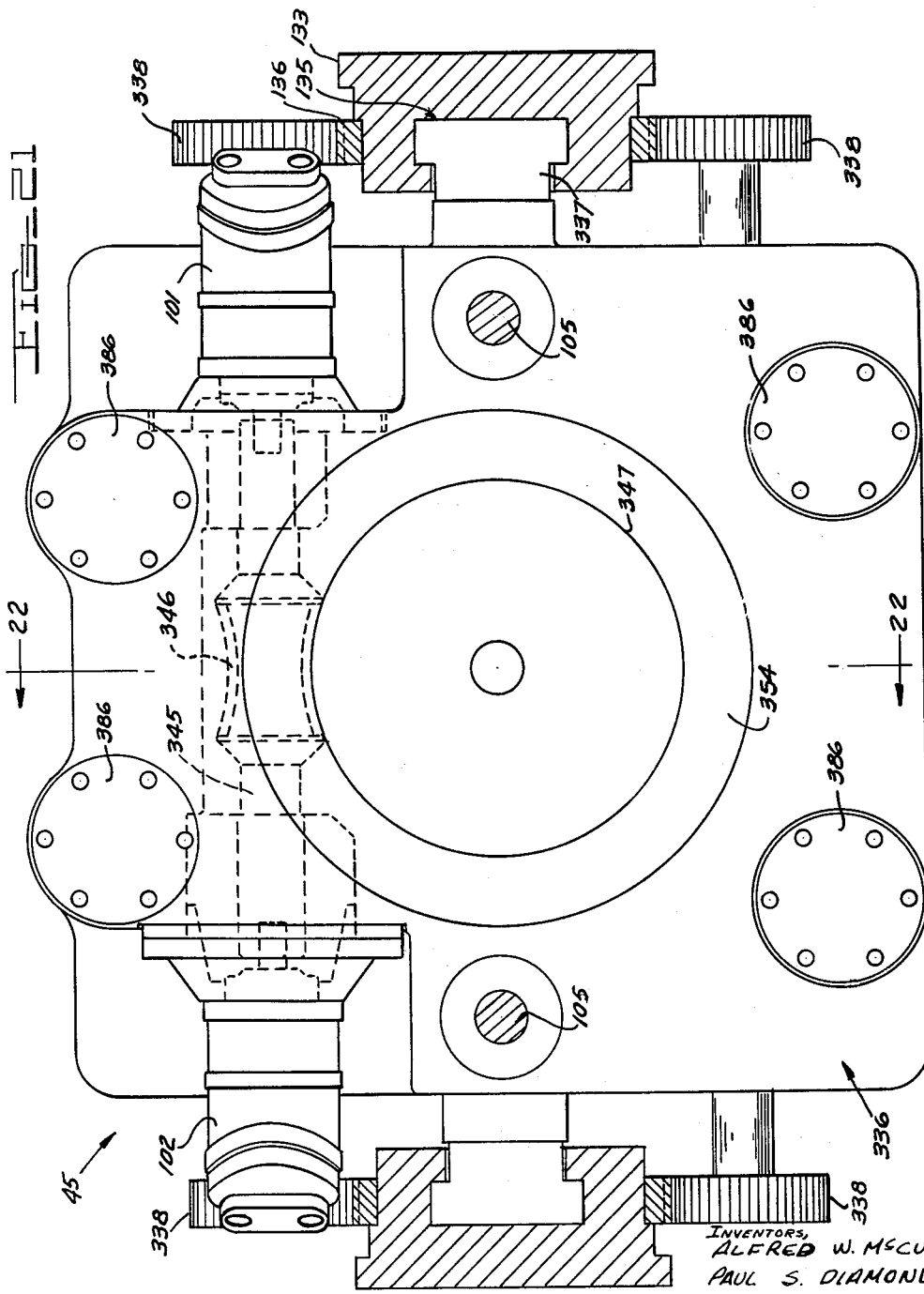

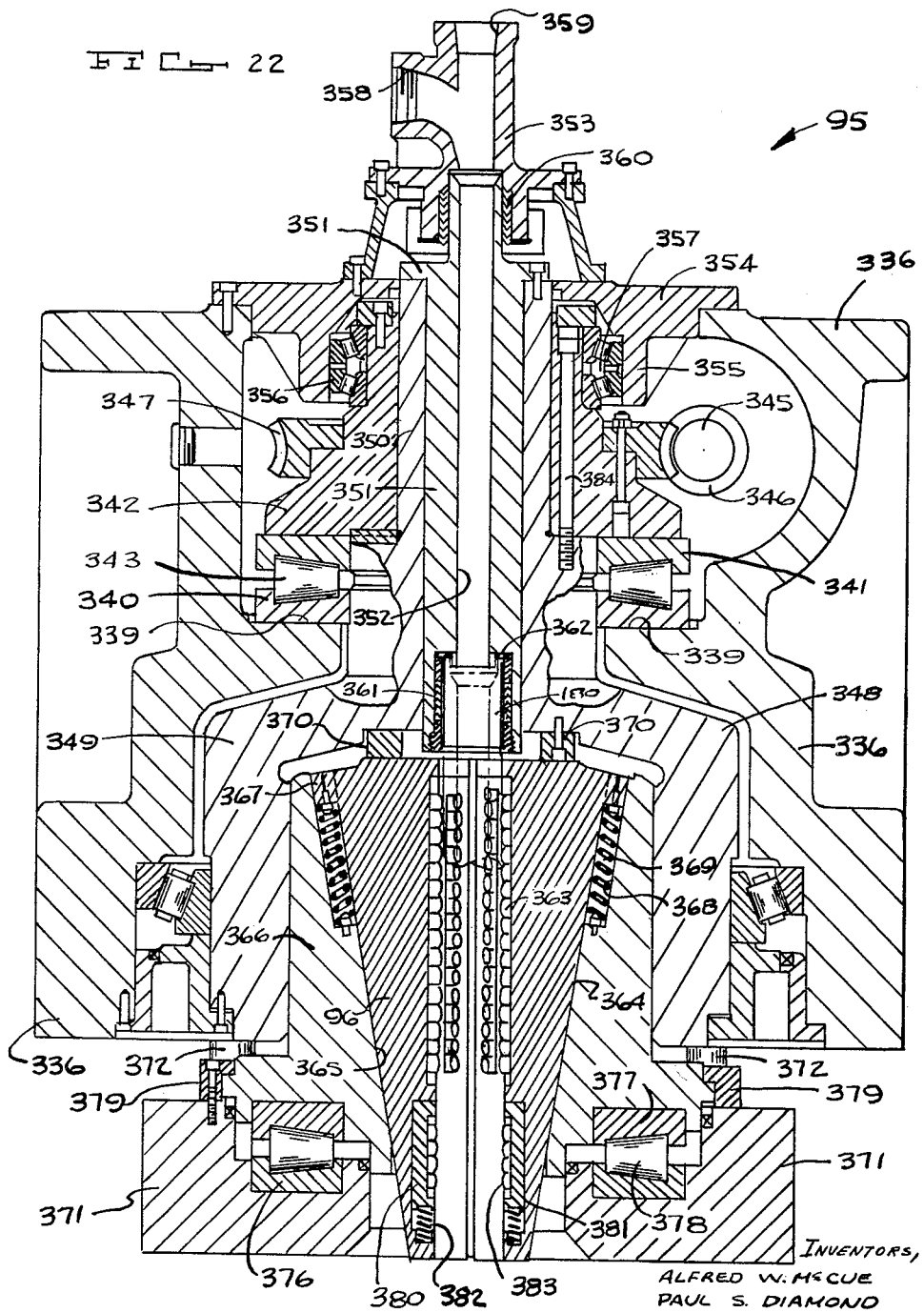

Nov. 24, 1964    A. W. McCUE ETAL    3,158,211
WELL DRILLING APPARATUS
Filed Sept. 16, 1957    25 Sheets-Sheet 21
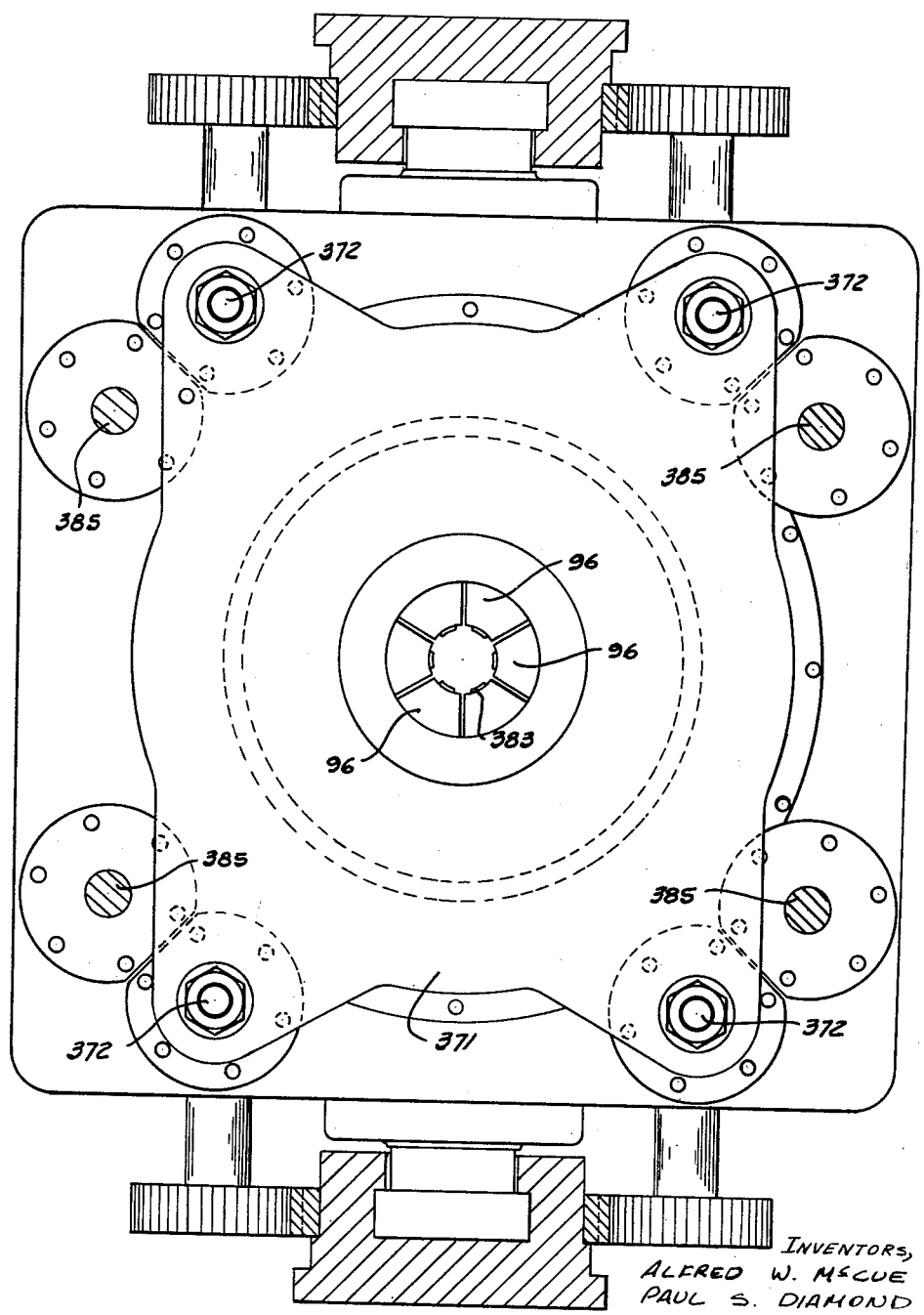
FIG_23
INVENTORS,
ALFRED W. McCUE
PAUL S. DIAMOND
DOYLE L. KINTIGH
JOSEPH V. O'NEILL
JESSE R. MOSER
BY SMITH, WILSON, LEWIS, McRAE Nov. 24, 1964   A. W. McCUE ETAL   3,158,211
WELL DRILLING APPARATUS
Filed Sept. 16, 1957   25 Sheets-Sheet 22

INVENTORS
ALFRED W. McCUE
PAUL S. DIAMOND
DOYLE L. KINTIGH
JOSEPH V. O'NEILL
JESSE R. MOSER
BY SMITH, WILSON, LEWIS, McRAE

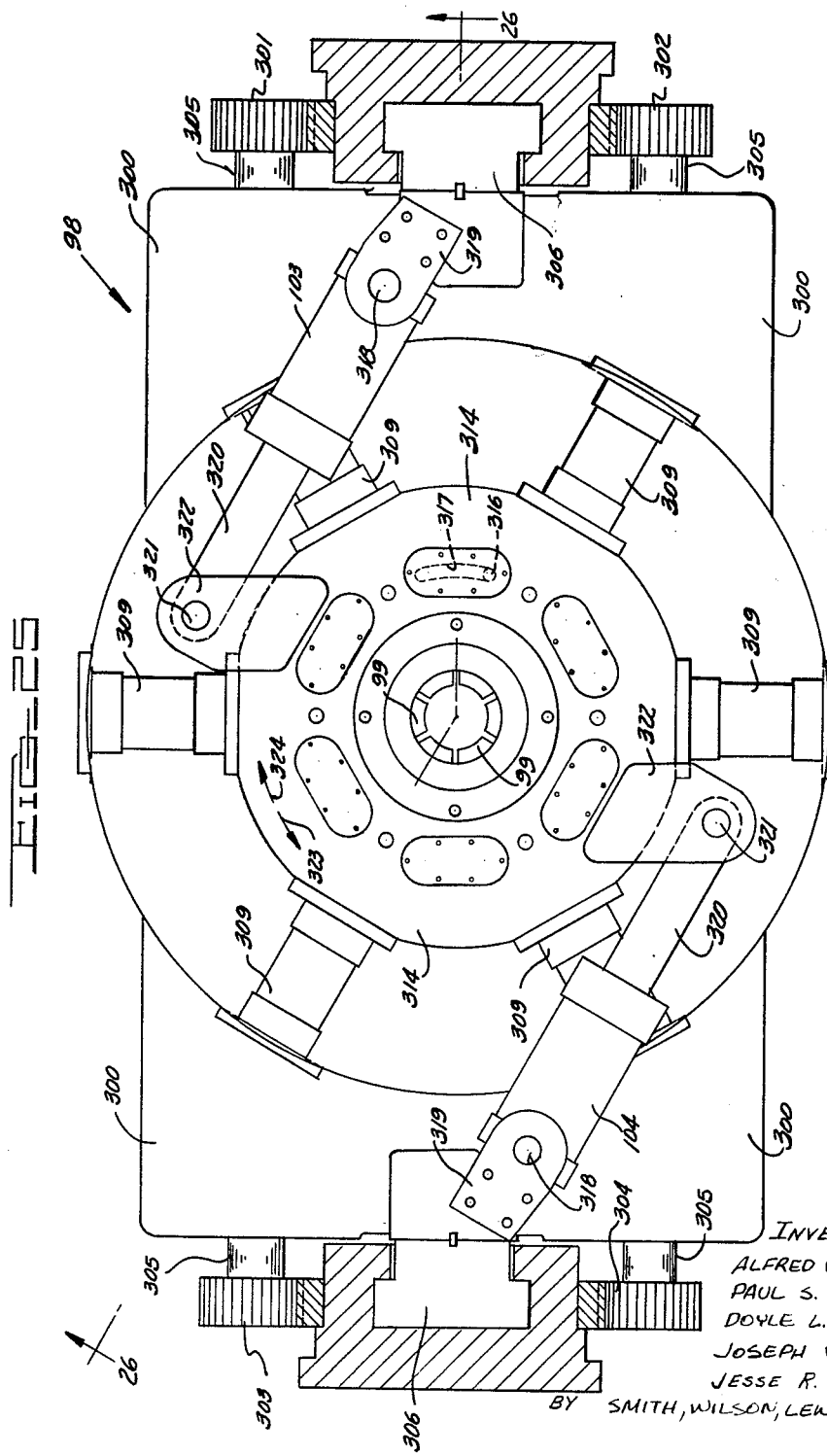

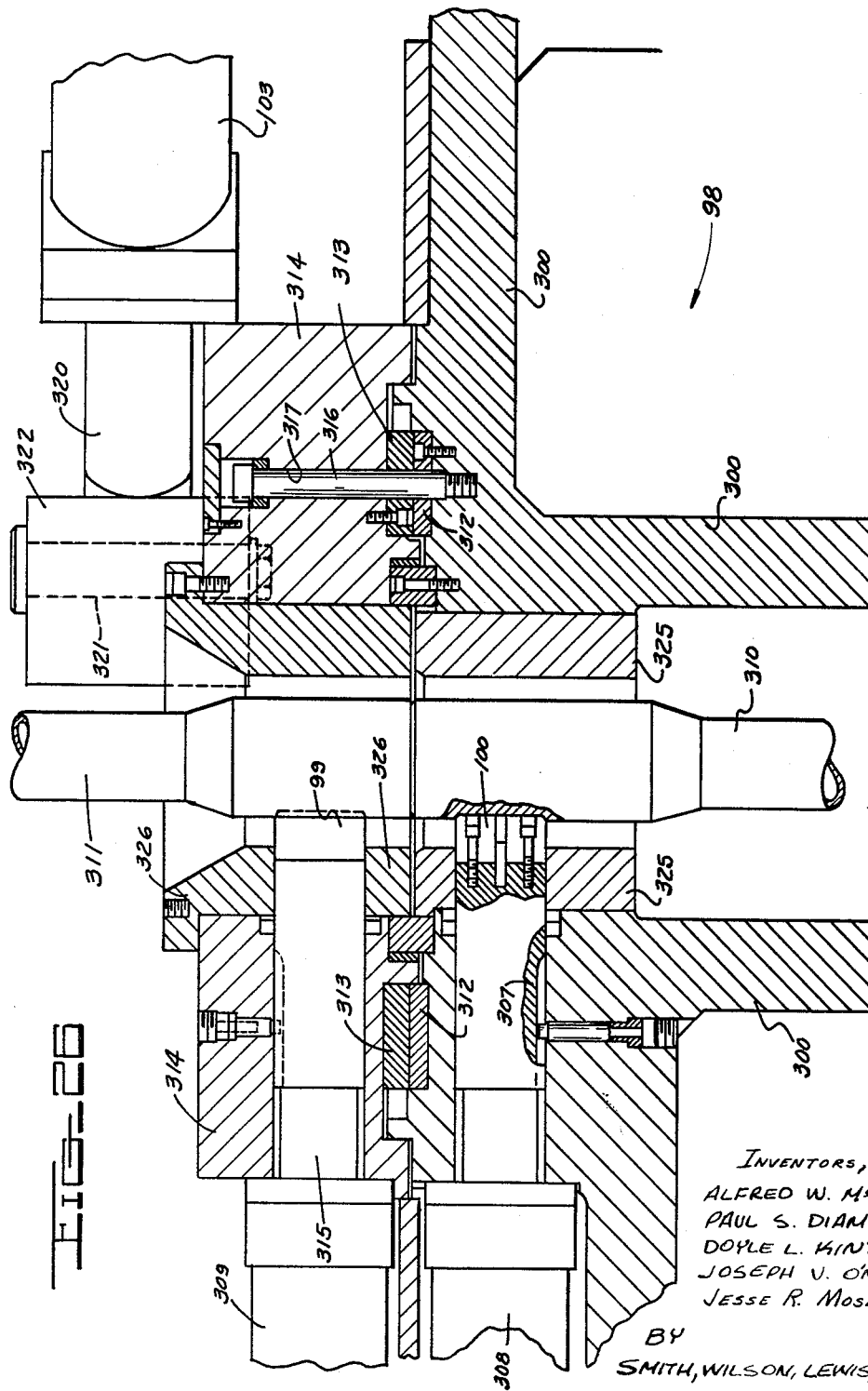

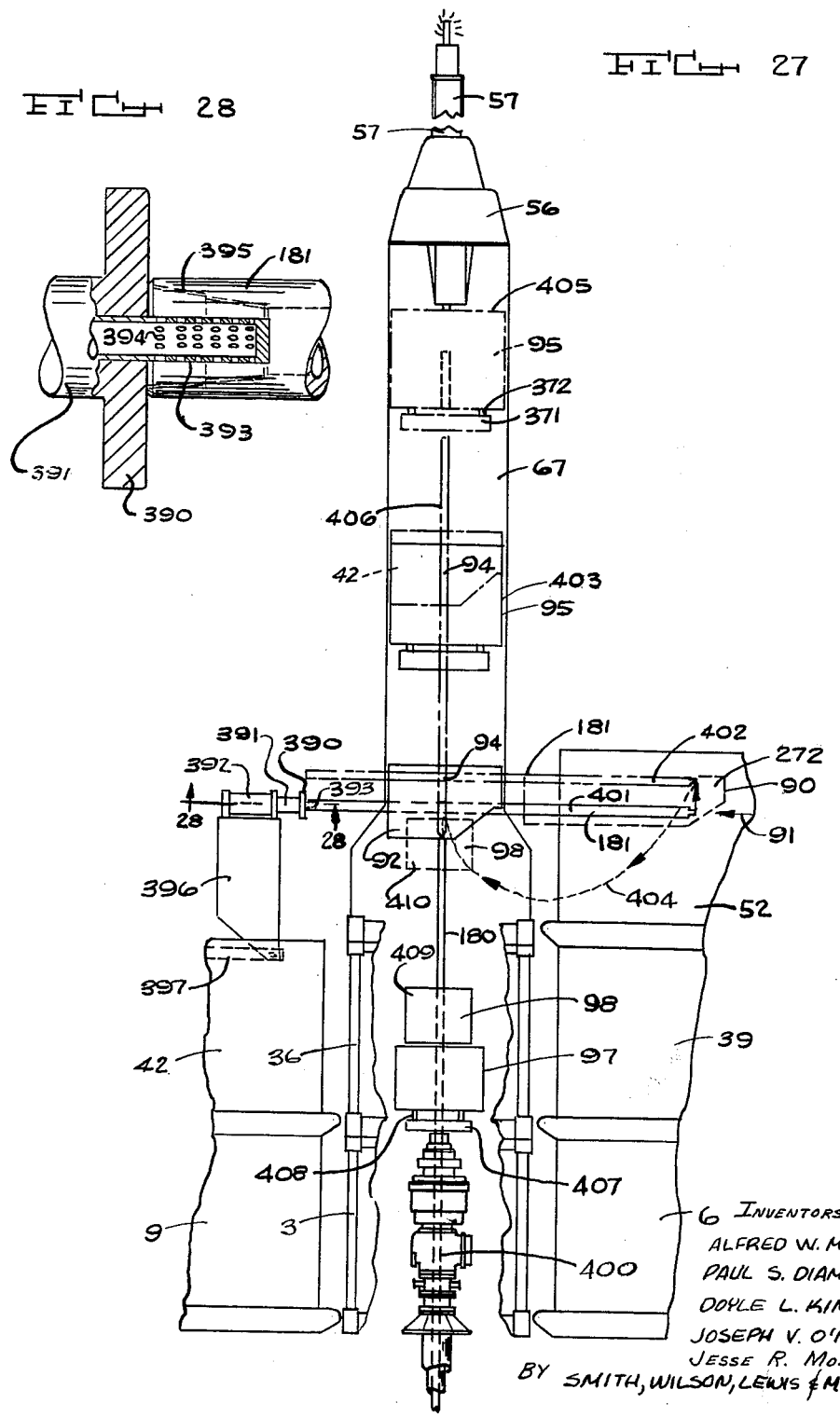

United States Patent Office 3,158,211
Patented Nov. 24, 1964

3,158,211
WELL DRILLING APPARATUS
Alfred W. McCue, Detroit, Paul S. Diamond and Doyle L. Kintigh, Livonia, Joseph V. O'Neill, Inkster, and Jesse R. Moser, Dearborn, Mich., assignors, by mesne assignments, to Leyman Corporation, Cincinnati, Ohio, a corporation of Ohio
Filed Sept. 16, 1957, Ser. No. 684,176
18 Claims. (Cl. 175—85)

The invention relates to oil well drilling apparatus, and particularly automatic oil well drilling apparatus wherein a minimum number of men are required to set up and maintain the apparatus during drilling operations, and wherein the apparatus is of such construction and design as to be capable of speedy drilling in deep wells in excess of 10,000 feet at a relatively low total drilling cost per foot of well length.

Drilling costs of conventional deep wells are relatively high due to the design and construction of conventional equipment which requires a relatively large personnel in each drilling crew and which requires comparatively great time expenditures for transportation of the drilling apparatus to the well site, set up of the apparatus on the site, and raising and lowering of the pipe string in the well hole.

There have been developed well drilling rigs which can be transported cross country to various well sites. However, the design features of these rigs have necessitated their use generally only in relatively shallow wells. Additionally these drilling rigs have generally been constructed to be carried on a comparatively small number of vehicles. The total weight of some deep well drilling rigs has sometimes been in the neighborhood of 400 tons. When this total weight was required to be carried on a comparatively small number of trailers and bogies the total weight on each vehicle was so high that each vehicle was required to have a special permit to travel over the highways of the various states between the initial location of the well drilling rig and the well hole site. These special permits customarily are not granted by the various states for a period of two or more days, and additionally these special permits in many cases only allow the truck to be driven on the state highways on special days and during specially restricted hours. As a result it was sometimes very difficult to move the drilling rigs from their initial locations to suspected areas of oil deposits quickly enough to permit competition with other drillers who might be in the area of the contemplated well hole site at the particular time.

Under the present invention the oil well drilling apparatus is constructed in a comparatively large number of easily assembled sections so as to permit construction of each individual section as a comparatively light article, thereby enabling the various sections to be transported individually on trailers and bogies without requiring special permits from the states or "hours of travel" restrictions.

The design of conventional "knockdown" rigs is such that assembly of the rig sections together to produce an operative rig requires a comparatively large time expenditure. Often a period of two weeks is required to set up the drilling apparatus after arrival of the apparatus on the drilling site.

Under the present invention the drilling apparatus comprises a large number of skid-carried sections with power-operated mechanisms in the various skids operatively connecting the skid mechanisms together at the drilling site. The arrangement and design of the various skid mechanisms is such that the drill rig sections can be assembled into operative relation with one another in a comparatively short period of time, the total period being in the neighborhood of four hours.

Conventional well drilling rigs are of such design as to require a crew of approximately six men for adequate control of the drill pipe during assembly anud disassembly of the drill pipe string in the well hole. By use of the present invention a two-man crew can conveniently control the drilling operation.

Many of the men in the conventional drilling crew must expose themselves to extremely dangerous conditions, as during lassoing of pipe, shoving the pipe onto the conventional finger board and manipulating the pipe into and out of positions in the pipe string. Such danger to the well drilling crew is of course reflected in high insurance costs for the drilling operator, present insurance rates being in the neighborhood of $35,000 per year per $1,000,000 coverage. Under the system and mechanism of operation of the present invention the manipulation of the pipe into and out of the pipe string is performed mechanically with no manual manipulative operations required to be performed by the crew. The operation is thereby more satisfactory, both by reason of elimination of personal danger to the drilling crew and greatly reduced insurance costs for the drilling operator.

In the past many of the above discussed problems have led the oil well apparatus manufacturers to construct their apparatus of comparatively light gauge materials in order to reduce the drilling rig weight and facilitate handling of the pipe and other mechanisms utilized in the drilling operation. By thus reducing the weight of the apparatus the manufacturers have inherently lessened the strength of the apparatus in such manner that the apparatus is prone to prematurely break down. As a result "down time" is excessive. The design of the present apparatus in a large number of rig sections permits each component part to be constructed of comparatively heavy high strength material so as to materially prolong the useful life of the apparatus and permit shorter "down times" for repair or replacement purposes. Additionally the present apparatus is so designed as to permit easy and quick disassembly of the operative components for repair and replacement purposes, thereby further reducing "down time."

Objects of the present invention are to provide deep well drilling apparatus wherein:

(1) The apparatus components can be constructed as relatively strong and heavy structures, while still permitting them to be easily and quickly "knocked down" into a large number of subsections for fast transport to new well site locations, (2) The apparatus incorporates mechanism for automatically feeding pipe into assembled positions in a pipe string with operator control and vigilance, thereby reducing total manpower required to operate the well, (3) The apparatus operates on drill pipe in such manner as to obtain long pipe thread life, thereby economizing on pipe costs, (4) The apparatus operates without the use of cables, thereby eliminating cable replacement costs (such costs sometimes running in the neighborhood of fifty cents per foot of well length), (5) The apparatus operates to drive various size casing as well as various size pipe and sucker rod, thereby reducing total drilling time and expense, (6) The various features of the apparatus combine to give low total drilling costs per foot of well length, and (7) The design of the apparatus is such as to give increased protection against well blowouts.

Other objects of this invention will appear in the following description and appended claims, reference being had to the accompanying drawings forming a part of this specification wherein like reference characters designate corresponding parts in the several views.

In the drawings:

FIG. 1 is a plan view of an oil well drilling apparatus which comprises a plurality of separate skid structures arranged adjacent one another so as to operatively support the pipe storage, pipe raising, and pipe transfer mechanisms forming the subject matter of the present invention, FIG. 2 is an elevational view taken on line 2—2 in FIG. 1, FIG. 3 is an elevational view taken substantially on line 3—3 in FIG. 1, FIG. 4 is a schematic view showing the arrangement of skids illustrated in FIGS. 1, 2 and 3, with each rectangular area in FIG. 4 representing one skid, and with the skids separated into decks, there being three decks of skids and the number of skids being different in each deck according to the function and structure of the mechanisms carried by the respective skid. In FIG. 4 the various skids are labeled in accordance with the character and function of the mechanism seated on the respective skid, FIG. 5 is an elevational view of a skid in position on a set of bogies for transportation to the drilling site, FIG. 6 is an elevational view of a second type skid in position on a set of bogies for transportation to the drilling site, FIG. 7 is an elevational view of a third type skid in position on a set of bogies for transportation to the drilling site, FIG. 8 is an elevational view showing a skid-positioning vehicle 58 positioned on a truck for transportation to the drilling site. Vehicle 58 is utilized in conjunction with a second similar vehicle for unloading various skids from their bogies and transferring the skids to their "operative" positions of close adjacency illustrated in FIG. 1, FIG. 9 is an elevational view showing the vehicles 58 in operative positions for transferring and manipulating one of the skids into its FIG. 1 position, FIG. 10 is a sectional view taken substantially on line 10—10 in FIG. 1, FIG. 11 is an enlarged view taken in the same direction as FIG. 10 and illustrating a shuttle mechanism utilized to transfer pipe from horizontal conveyors 81 to vertical conveyor 83, FIG. 12 is an elevational view of a skid 26 with parts broken away substantially on line 12—12 in FIG. 1, FIG. 13 is an enlarged view taken substantially on line 13—13 in FIG. 1, FIG. 14 is an elevational view taken on line 14—14 in FIG. 13, FIG. 15 is a view taken in the same direction as FIG. 10, but with parts removed to illustrate a "chain collapsing" mechanism, FIG. 16 is a view taken partly in section on line 16—16 in FIG. 18, FIG. 17 is a view taken substantially along line 17—17 in FIG. 16, FIG. 18 is an elevational view of skid structure 52 with parts broken away for illustration purposes. The skid structure shown in FIG. 18 is utilized to shift pipe into the FIG. 19 bailer during assembly of pipe into the pipe string, and to receive pipe from the bailer during disassembly of the pipe out of the pipe string, FIG. 19 is a sectional view taken on line 19—19 in FIG. 20 of a bailer structure employed in the invention, FIG. 20 is a top plan view of the FIG. 19 bailer structure employed in the FIG. 1 arrangement. The bailer structure rotates drill pipe between horizontal and vertical positions to insert the pipe into the FIG. 21 drill head, FIG. 21 is a top plan view of a drill head construction utilized in the FIG. 1 arrangement. The FIG. 21 structure raises and lowers the pipe string in the well hole and additionally rotates it to effect the necessary drilling action, FIG. 22 is a sectional view on line 22—22 in FIG. 21, FIG. 23 is a bottom plan view of the FIG. 21 drill head, FIG. 24 is an end elevational view of the FIG. 21 drill head structure with parts broken away for illustration purposes, FIG. 25 is a top plan view of a "make and break" chuck structure utilized in the FIG. 1 arrangement, FIG. 26 is an enlarged sectional view taken on line 26—26 in FIG. 25, FIG. 27 is a view taken substantially on line 27—27 in FIG. 1, and FIG. 28 is an enlarged sectional view taken substantially on line 28—28 in FIG. 27.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings there are shown in FIG. 4 a number of separate skids identified by reference numerals 1 through 53. Skids 1 through 33 are positioned alongside of one another as shown in FIG. 4 so as to be on the same level with one another in a manner to constitute a "lower deck" of skids. Skids 34 through 46 are positioned atop skids 1 through 13 so as to form an "intermediate deck" of skids. Thus skid 34 is positioned atop skid 1, skid 39 is positioned atop skid 6, skid 42 is positioned atop skid 9, and skid 44 is positioned atop skid 11. Skids 47 through 52 are positioned atop skids 34 through 39 so as to form an upper deck of skids. Thus, for example, skid 48 is positioned atop skid 35 and skid 52 is positioned atop skid 39.

Skid 53 is positioned away from skids 1 through 52 which constitute the apparatus for drilling the well and handling the various pipe used in the well drilling operation. Skid 53 contains control mechanisms which need not be located adjacent the well hole. Since this is the case it is desirable that this skid be set apart from the other skids so as to prevent damage thereto in the event of a well blowout. The construction of the mechanisms within skid 53 is however designed to be strong enough to withstand the force of a blowout, and accordingly if well site locations should so dictate skid 53 can be located adjacent the other skid structures.

The skids are each of the same length and width so as to be individually transportable on the same type of trailer structure, and so as to be positionable into the skid arrangement shown in FIG. 1. In the illustrated embodiment each of the skids is approximately thirty four feet long and eight feet wide, i.e., within state requirements for length and width without necessitating special travel permits. Skids 47 through 51 (FIG. 2) are intended to serve as support structures for the derrick superstructure; hence these skids are constructed as flat members having a relatively small vertical dimension. The remaining skids are intended to serve as housings for well drilling mechanisms; hence these skids are constructed as rectangular box-like members with a vertical dimension of approximately eight feet.

Each of skids 1 through 46, 52 and 53 is transported individually to the drill site on a separate set of bogies as shown in FIG. 5. The number of drill pipe skids 7, 8 and 18 through 33 will vary in accordance with the ultimate depth of the drilled well, and accordingly the total number of skids in the system will vary with each well. In the illustrated embodiment each drill pipe skid is adapted to house ninety separate drill pipes, each having a length of fifteen feet, the total drill pipe length carried by each skid being 1350 feet. A twenty five thousand foot well would require eighteen drill pipe skids whereas a ten thousand foot well would require only seven drill pipe skids.

Skids 47 and 51 serve as support structures for derrick sections 56 and main cylinders 57 during transportation to the drill site. Each of skids 47 and 51 is loaded onto a separate set of bogies as shown in FIG. 6.

Skids 48 and 50 serve as support structures for derrick sections 67 during transportation to the drill site. Each of skids 48 and 50 is loaded onto a separate set of bogies as shown in FIG. 7.

Each of the skids is provided with four hydraulically operated jack structures 54 which can be raised to lift the respective skid off of its set of bogies and support it until vehicles 58 have been driven into the FIG. 9 positions for transfer of the skid to its "operative" position. The skids may be "loaded" onto vehicles 58 by driving vehicles 58 adjacent the ends of the skids (with pistons 61 elevated) so as to insert probe arms 59 into openings 65 in the skid end walls as shown in FIG. 9. Skids 1 through 33 may then be arranged in their FIG. 4 positions by vehicles 58. Skids 34 through 52 may by individually raised onto the lower deck skids by means of cable-winch mechanisms (not shown), each of the skids being provided with pulleys at its opposite ends for guiding the cables during the skid-raising operation. The winch and cable mechanisms used to put the upper deck skids in their FIG. 1 positions are not part of the present invention, and they have accordingly not been illustrated in the drawings. Various mechanisms could be employed for elevating the skids into their FIG. 1 locations, it being understood that the present invention is concerned primarily with the operation of the skid-carried mechanisms after the skids have been positioned in their FIG. 1 arrangement. Vehicles 58 are provided with bulldozer blades 66 for smoothing the land preparatory to positioning the skids into the FIG. 1 arrangement. As noted in FIGURE 8, vehicles 58 are retained in hauling position by chains 62 and hold arms 63, pivoted to swing out of the way as at 64, a detachable connection being provided at 64c.

When the various skids are located in the FIG. 1 arrangement, derrick sections 56 and 67 are adapted to be assembled together into their FIG. 2 positions. Skids 47 and 51 (FIG. 6) are provided with slide structures 68 which carry a cradle structure 69 for derrick sections 56 and main cylinders 57. Skids 48 and 50 (FIG. 7) are provided with slide structures 70 which mount two upstanding arms 71. Derrick sections 67 are provided with arms 72 (FIG. 3), and pins 73 are extended through arms 71 and 72 to mount sections 67 for pivotal movement around the pin axes.

In order to move main cylinders 57 and derrick sections 56, 67 into their FIG. 2 positions, slide structures 70 with structures 67 are first slid from skids 48 and 50, FIGURE 7, onto skid 49 so as to position arms 71 in their FIG. 2 positions. Thereafter slide structures 68 with derrick sections 56 are slid from skids 47 and 51 onto skids 48 and 50, respectively, so as to position sections 56 against sections 67 as indicated by the dotted line "prone" position in FIG. 2. Each of sections 56 is then fastened onto its adjacent section 67 so as to form a rigid derrick structure. Suitable fluid cylinder or power-driven rack structures (not shown) may be mounted in skids 47, 48, 50 and 51 for sliding slide structures 68 and 70 from one skid to another. Alternately the slide structures can be pulled from one skid to another by cable mechanisms (not shown).

In order to raise derrick structures 56, 67 from their FIG. 2 "prone" positions into their FIG. 2 full line positions there are provided two sets of fluid cylinder mechanisms 74, each of which is pivotally mounted at its lower end in a support structure 75 positioned within skids 35 and 37. Each of cylinders 74 includes fluid cylinders 76, which slidably receive pistons 78. The upper ends of pistons 78 are pivotally connected at 79 to derrick sections 67. Introduction of pressure fluid into cylinders 76 causes pistons 78 to "expand" outwardly so as to raise derrick sections 67 and 56 from the FIG. 2 "prone" positions into the FIG. 2 full line positions. Thereafter sections 56 are rigidly connected with one another to coact with sections 67 in the formation of a fixed derrick structure.

During transport of the various skids between drill site locations, pivotal connection 79 is broken to permit separation of the upper deck skids from the intermediate deck skids. In the event that it becomes necessary to replace fluid cylinder mechanisms 57, derrick sections 67 can be moved down to the FIG. 2 "prone" positions. This construction promotes attainment of one object of the invention, which is the quick replacement of any damaged mechanisms at the drilling site by merely replacing the respective skid on which the damaged part is carried, the arrangement being such that no appreciable drilling time is lost.

*General System of Pipe Handling*

The present invention is concerned primarily with the problem of storing and transferring pipe incidental to the operations of assembling and disassembling a pipe string in a well hole. In the illustrated embodiment when the pipes are out of the pipe string they are stored in skids 7, 8 and 18 through 33 (FIG. 4). Each of these skids contains an elevator 80 (FIG. 10) which serves to support ninety pipe. The pipe are arranged in six vertically spaced layers or rows, with fifteen pipe in each row. Endless conveyors 81 and 82 run through and between the various skids, the arrangement of the elevators with respect to the conveyors being such that when the elevator in any skid is lowered from its FIG. 10 position by a predetermined distance its lowermost row of pipe is deposited onto V-blocks 85 carried by the conveyors. The conveyors are then moved to carry the fifteen deposited pipe toward a shuttle mechanism 421 (FIG. 11) located adjacent a vertical conveyor 83 (FIG. 10). The shuttle mechanism 421 lifts pipe off of V-blocks 85 and transfers it horizontally into cradle members 84 carried by conveyor 83, it being understood that the shuttle mechanism is indexed toward the vertical conveyor in definite increment distances to deposit the pipe in cradle members 84, after which the vertical conveyor 83 is moved to convey the pipe upwardly to the upper limit of skid 39.

When the pipe reaches the upper limit of skid 39 it is lifted off of conveyor 83 by an arm 86 (FIG. 16) which is mounted on an elevator 87. Upward movement of elevator 87 causes the pipe on arm 86 to be placed between jaws 88, 89 of a carriage mechanism 90. This carriage mechanism is positioned in skid 52 which is located in the third deck of skids. The jaws of mechanism 90 are positioned about twenty-three feet above the lower limit or "baseline" of the lowermost deck of skids, which distance is sufficient to permit pivoting of drill pipe between horizontal and vertical positions during the process of assembling and disassembling the pipe string.

When jaws 88 and 89 are closed on the pipe, carriage mechanism 90 is moved horizontally in the arrow 91 direction (FIG. 18) so as to move the pipe into bailer structure 92 (shown in FIGS. 19 and 20). Bailer 92 is provided with jaw means 93 which grip the pipe and turn it about axis 94 from a horizontal position into a vertical position in vertical registry with drill head 95 (shown in FIGS. 21 through 24). Subsequent upward movement of bailer 92 causes the gripped pipe to be inserted into the jaws 96 of the drill head, after which the bailer jaws 93 can be disengaged from the pipe so as to leave it supported by the drill head jaws.

In the illustrated embodiment, mechanism is provided for automatically screwing and unscrewing the pipe together so as to assemble and disassemble the pipe string.

This mechanism goes into operation after the uppermost pipe is gripped by the drill head jaws 96. When it is desired to lengthen the pipe string the uppermost pipe in the "initially shortened" string is held by a chuck structure 97 (FIG. 27). This chuck structure 97 includes a set of openable and closable jaws (not shown) which move radially inward against the pipe side wall to support the pipe string beneath the drill head 95 and bailer 92.

Between bailer 92 and string support chuck structure 97 there is positioned a "make and break" chuck 98 shown in detail in FIGS. 25 and 26. Chuck 98 is provided with two sets of jaws 99 and 100. The upper jaws 99 are intended to grip the lower end of the pipe held by drill head 95, and the lower jaws 100 are adapted to grip the upper end of the pipe held by string support chuck 97. The function of make-and-break chuck 98 during assembly of a pipe into the pipe string is merely to effect a final tightening of one pipe on another. The process of screwing one pipe into another, however, is performed by drill head 95. Thus, with the pipe string supported by string support chuck 97, drill head 95 lowers the uppermost pipe down into the string pipe gripped against rotation by jaws 100. As the uppermost pipe nears the female threads on the subjacent pipe, fluid motors 101 and 102 (FIG. 21) on drill head 95 rotate jaws 96 in such manner as to thread the drill head-carried pipe into the support chuck-carried string pipe. During this threading movement jaws 100 may be released from the pipe. To tighten the pipe joint, jaws 100 are caused to grip the string pipe, and fluid cylinders 103 and 104 (FIG. 25) on the make-and-break chuck 98 are energized to rotate the upper chuck jaws 99 around a vertical axis. In this manner the force of fluid cylinders 103 and 104 is added to the force of motors 101 and 102 in the drill head 95 so as to tighten one pipe on another.

When the pipe string is lengthened the various chuck jaws are retracted out of engagement with the pipe, and drill head 95 lowers the string into the well hole for drilling operations. Head 95 is carried on the lower ends of piston rods 105 which extend downwardly from main cylinders 57, the arrangement being such that pressure fluid within the lower ends of cylinders 57 serves to partially support the weight of the drill string so as to maintain a satisfactory pressure on the drilling bit. Rotation of the drill string is effected by motors 101 and 102 (FIG. 21), it being appreciated that the illustrated embodiment does not employ the conventional rotary table for this purpose.

From the foregoing brief discussion it will be appreciated that the primary working mechanisms in the illustrated apparatus are:

(1) The pipe storage elevators (FIG. 10),
(2) The horizontal pipe transfer between drill pipe skids (FIGS. 10, 13 and 14),
(3) The shuttle mechanism between horizontal conveyors 81 and 82 and vertical conveyor 83 (FIG. 11),
(4) The vertical conveyor mechanism (FIGS. 10 and 15),
(5) The carriage mechanism for feeding pipe horizontally toward the pipe string (FIGS. 16 and 18),
(6) The bailer mechanism 92 for turning the fed pipe from horizontal into a vertical position in alignment with the pipe string (FIGS. 19 and 20),
(7) The drill head 95 for screwing pipe together and operating the pipe string in the well hole (FIGS. 21 through 24), and
(8) The "make and break" chuck structure 98 for effecting a final tightening or initial loosening of the pipe in the string (FIGS. 25 and 26).

The detailed workings of the above mechanisms, as well as their working relationships with each other will be more apparent after the following detailed description.

*Pipe Storage Elevators (FIGS. 10 and 12)*

Each of the drill pipe skids 7, 8 and 18 through 33 contains a pipe-storage elevator similar to elevator 80 shown in FIGS. 10 and 12. This elevator 80 includes end members 106 to which are secured six pipe-supporting members 107 through 112. Each of members 107 through 112 is contoured to provide fifteen pockets or cradle portions for the support of fifteen pipe, the arrangement being such that ninety pipe are supported on the elevator when it is fully loaded.

The elevator is guided for vertical movement by means of four posts 113 and four posts 422 fixedly mounted in the skid. FIG. 12 shows two posts 113 but it will be appreciated that similar posts are spaced directly behind the illustrated posts. Each of end members 106 carries two vertically spaced arms 114 which slidably encircle the two adjacent posts 113 for accurate "non-jamming" guidance of the elevator. Each set of arms 114 mounts a rack 115 which meshes with a gear 116 driven by a fluid motor 117 via reduction gearing 118. Actuation of motor 117 rotates the various gears 116 so as to move the elevator up and down for the loading and unloading of pipe.

The elevator 80 unloads its pipe onto V-blocks 85 carried by endless chains 222, FIG. 13, which form conveyors 81, FIG. 10. Fifteen pipe are simultaneously unloaded onto V-blocks 85, after which chains 222 are moved by rotation of sprockets 231 to carry the "unloaded" pipe away from the space beneath the elevator.

It will be noted from FIG. 12 that the pipe in each row on the elevator are located quite closely adjacent the next row of pipe so as to store a maximum number of pipe on each skid. Because of this "closely spaced" relationship it is necessary that the vertical position of the elevator be quite closely controlled in order to allow correct unloading of each row of pipe onto V-blocks 85. For this purpose there are employed a plurality of indexing cylinders 119 which are provided with pistons 120. These pistons are adapted to selectively enter into any of six vertically spaced openings in adjacent bars 121 fixedly carried by arms 114. When the elevator 80 is lowered to place its lowest row of pipe onto V-blocks 85, pressure fluid is introduced into the outer ends of cylinders 119 to force pistons 120 into the adjacent openings in bars 121 in such manner as to adjust the elevator against any slight errors in position with respect to the V-blocks. With the elevator 80 held in adjusted position by pistons 120, sprockets 231 are turned (by a power source not shown) to move the fifteen "deposited" pipe away from the elevator.

In the FIG. 12 position V-blocks 85 are carrying pipe 122, and elevator 80 is fully loaded with other pipe. Pipe 122 were initially received from an elevator 80 located in one of the other pipe skids, it being appreciated that the skids are unloaded in sequence to form the drill string in the well hole.

The "loading" and "unloading" sequence between elevators and in each elevator may be varied to change the relative position of each pipe in the pipe string. In conventional constructions it is the practice to withdraw the pipe in sections of two or three pipe and to store these pipe sections without disconnecting the pipe within each section. This practice tends to prematurely wear out the pipe threads because the "continuously" meshed threads are partially "dug" into each other at the beginning of each usage in the string. At each subsequent usage the "continuously" meshed threads dig further into each other so as to cause premature "stripping" of the threads. When the position of each pipe in the string is varied the meshed threads do not tend to dig into each other to any great extent because the exact points of wear on the meshed threads do not coincide.

The manner of storing pipe in the skid-carried elevators shown in FIG. 12 (together with other features of the invention) enables repositioning of the various pipe in different locations within the string. The loading and unloading of pipe is accomplished quickly and without the manpower requirements necessitated with prior art arrangements. As a result it is feasible to disconnect each individual pipe in the string so as to permit the desired "pipe relocation" and increase in thread life.

*Bridging Conveyors (FIGS. 13 and 14)*

The bridging conveyor mechanism 82 shown in FIGS. 13 and 14 is intended to carry pipe across the space between adjacent drill pipe skids 7, 8 and 18 through 33. During transportation of the drill pipe skids between different well site locations each bridging conveyor mechanism is housed within one of the drill pipe skids. When the next well site location is reached and the various drill pipe skids are assembled into their FIG. 4 positions the bridging conveyors are moved out from their drill pipe skids so as to bridge the space between adjacent drill pipe skids. In their "bridged" positions the bridging conveyors are adapted to cooperate with conveyors 81 for carrying pipe between skid elevators 80 and vertical conveyor 83.

Each bridging conveyor 82 includes two sets of endless chains, one of which is indicated in FIGS. 13 and 14 by reference numeral 220. It will be appreciated from FIG. 14 that chain 220 is intended to support one end of the pipe 221, the other end of the pipe being supported by a similar chain (not shown). The support mechanism for each chain 220 includes two pair of standards 200 and 201 fixedly interconnected together by a base 217 and upstanding webs 218. Base 217 is provided with machined surfaces 202, FIG. 14, which slidably seat on guide surfaces 203 of guide structures 204 and 205. Guide structure 204 is fixedly carried on drill pipe skid 24, FIG. 13, and guide structure 205 is fixedly carried on the adjacent skid 25.

Standards 200 and 201 adjustably mount two sets of pillow blocks 206 and 207 which rotatably carry two sleeves 208. Chain-supporting sprockets 227 and 228 are fixedly carried on respective ones of sleeves 208. An idler sprocket 229 is rotatably carried on an arm 230 which is pivotally mounted on one of standards 201, the arrangement being such that endless chain 220 is trained around sprockets 227, 228 and 229.

The internal surfaces of sleeves 208 are grooved to form spline keyways 209 which are adapted to slidably receive mating splines formed on a shaft 210. The right end of shaft 210, FIG. 14, is enlarged and rotatably received within a bearing member 211 carried by a slide member 212 which operates in a fixed guide structure 219. A depending arm 213 connects slide member 212 with piston 214 of fluid cylinder 215. The arrangement is such that introduction of pressure fluid into the left end of cylinder 215 (FIG. 14) moves piston 214 to the right in such manner as to draw shaft 210 out of sleeve 208 so as to put its left end in dotted line position 216. When shaft 210 is in the dotted line position 216 the integral structure formed by standards 200, webs 218, base 217 and standards 201 can be moved from its "bridged" position to a position supported entirely by skid 24. When the bridging conveyor is in the "bridged" position it is accurately located with reference to the axes of shafts 10 by the mechanism of a fluid cylinder 234 and piston 235. Cylinder 234 is fixedly mounted on skid 24, and piston 235 is adapted to enter into a socket-forming member 236 which is carried by one of the standards 200. Before the bridging conveyor 82 is moved to its retracted position piston 235 is withdrawn from socket member 236.

The function of shaft 210 is to operatively interconnect chain 220 with chain 222 of conveyor 81 (FIG. 10) so that chains 220 and 222 can operate together to carry pipe between vertical conveyor 83 and the pipe storage elevators 80 in the various drill pipe skids. It will be understood from FIG. 14 that each chain 222 is adapted to support only one end portion of the pipe, the other end portion of the pipe being supported by a similar chain (not shown in FIG. 14).

The support mechanism for chain 222 includes two sets of standards 223 and 224 located at opposite sides of the respective drill pipe skid as shown in FIG. 13. The standards support pillow blocks 225 (hidden behind pillow blocks 206 and 207 in FIG. 13) which rotatably mount sleeves 226. One of sleeves 226 is located directly behind sleeve 208 in FIG. 13, and the other sleeve 226 is located directly behind sleeve 209. Sleeves 226 are provided with spline keyways (similar to keyways 209) which slidably engage the splines on shaft 210, the arrangement being such that the various sleeves 226 are interlocked with sleeves 208 for conjoint rotation (when shaft 210 is in its extended FIG. 14 full line position).

Sleeves 226 fixedly carry sprockets 231 which support chain 222. It will be appreciated that none of chains 222 extends across the spaces between adjacent skids; rather each chain 222 is trained around the two sprockets 231 which are located at opposite sides of the same skid. When the various shafts 210 in each of the skids are in their FIG. 14 extended positions all of the chains 220 and 222 in and between all of the skids 6 through 8 and 13 through 18 (FIG. 4) are interlocked for simultaneous movement. Thus, with reference to FIG. 13, if sprocket 227 is rotated (by a power source not shown) chain 220 transmits this rotation to sprocket 228, which in turn acts through its shaft 210 to rotate the aligned sprocket 231, which in turn moves chain 222 on skid 25. Simultaneously the shaft 210 for sprocket 227 causes rotation of the aligned sprocket 231 so as to move chain 222 on skid 24. In similar manner all of the various chains 220 and 222 are interlocked for conjoint movement so as to permit movement of the entire horizontal conveyor mechanism from a single power source. Preferably this power source is located in central skid 6 (FIG. 10) so as to enable interchangeable use of the drill pipe skids without requiring any "specialized" drill pipe skid construction.

The mechanism for moving the bridging conveyor mechanism 82 between its FIG. 12 "bridging" position and its retracted position supported entirely on one of the drill pipe skids includes a fluid cylinder 232 and piston 233. In the illustrative showing in FIG. 13 piston 233 is rigidly secured on base 217, and cylinder 232 is fixedly carried by drill pipe skid 24. Introduction of pressure fluid into the right end of cylinder 232 causes piston 233 to retract into cylinder 232 so as to carry the rigid assembly of elements 200, 201, 218 and 217 into a supported position on skid 24. Of course the actuation of cylinder 232 does not take place until cylinders 215 (FIG. 14) have first been energized to retract shafts 210 to their dotted line positions 216.

*Shuttle Mechanism 421 (FIG. 11)*

In order that a maximum number of pipe can be stored in each of the drill pipe skids 7, 8 and 18 through 33, it is necessary that the various pipe be positioned very close to one another in each horizontal row. As a result the pipe are necessarily close together on V-blocks 85. When the conveyors 81 and 82 are moved to carry the pipe toward vertical conveyor 83 it is thus impossible (without backing up the horizontal conveyors) to transfer the pipe directly from blocks 85 onto cradles 84 because the next succeeding cradles would strike the next succeeding pipe on conveyor 82. In this connection it will be noted that some of the cradles are larger than others so as to project laterally outward into vertical registry with the pipe on conveyors 82.

In order to prevent the larger size cradles 84 from striking the pipe on conveyors 82 there is provided the shuttle mechanism 421 shown in FIG. 11. This shuttle mechanism lifts the pipe off of the leading conveyor block 85 and shifts it individually into the appropriate cradle 84 (independently of the remaining pipe on blocks 85). As a result the shuttle-carried pipe is enabled to "lead" the other pipe sufficiently so as to prevent the larger size cradles from striking the next pipe.

Shuttle mechanism 421 includes a fixed guide member 423 which serves to fixedly mount a fluid cylinder 424 having a movable piston rod 425. Rod 425 is connected to the web portion 426 of a slide member 427, the arrangement being such that introduction of pressure fluid into the left end of cylinder 424 is effective to move slide member 427 toward dotted line position 428.

Member 427 fixedly mounts a fluid cylinder 429, which is provided with a movable piston rod 430. The upper end of rod 430 is connected to an elevator body 431 which carries pipe-supporting blocks 432. Body 431 is provided with guide pins 431p which slidably extend through bearing structures 433 in slide 427 to guide the elevator body in its vertical movement.

In operation of the shuttle mechanism the horizontal conveyors 81 and 82 are actuated to position a pipe above blocks 432. Thereafter pressure fluid is introduced into the lower end of cylinder 429 to move elevator body 431 upwardly to dotted line position 434. Cylinder 424 is then actuated to move slide 427 to phantom line position 428 and body 431 to phantom line position 435, with the "lifted" pipe deposited in the appropriate cradle 84 of vertical conveyor 83. Since the shuttle mechanism is movable independently of conveyors 81, 82 it can carry its pipe forward of the pipe on blocks 85 in such manner that cradles 84 are incapable of striking the remaining pipe on the horizontal conveyors.

It will be noted from FIG. 11 that various size pipe and casing can be carried by blocks 85. The construction of the shuttle mechanism is such that it can handle all of the various size pipe and casing.

Vertical Conveyor 83 (FIGS. 10 and 15)

In its operative position vertical conveyor 83 extends through both of skids 6 and 39. Since it is desired under the present invention to transport each skid on a separate vehicle it is necessary that conveyor 83 be capable of storage in only one of the skids. The mechanism for moving the conveyor into its "transport" or "storage" position is illustrated in FIG. 15.

Vertical conveyor 83 includes two endless chains 83c, only one of which is visible in FIGS. 10 and 15. These chains are trained around upper and lower sprockets 83su and 83sl, it being appreciated that the chains are spaced apart from one another so as to support opposite end portions of the pipe being carried. The uppermost sprockets 83su, are carried by a shaft 237, FIG. 10, which extends outwardly beyond sprockets 83su into bearings 238 fixedly carried at the upper ends of piston rods 239. Piston rods 239 extend downwardly into cylinders 240, which in turn extend downwardly into second fluid cylinders 241 fixedly mounted in lower skid 6. FIG. 10 shows a single piston rod 239, single cylinder 240 and single cylinder 241, but it will be understood that similar mechanisms are positioned directly behind the illustrated mechanisms for elevating the remote end of shaft 237 into the FIG. 10 position. Suitable horizontally-acting fluid cylinder mechanisms (not shown) may be employed to support shaft 237 in the FIG. 10 elevated position so as to relieve stress on cylinders 240 and 241, thereby preventing collapse of chains 83c in the event of fluid pressure failure in cylinders 240 and 241.

Sprockets 83sl are fixedly carried on an elongated shaft which is rotatably journaled adjacent its opposite ends in suitable standards not shown. Preferably the lower shaft is the power shaft for conveyor 83, with a power source (not shown) in skid 6 serving to rotate the shaft and its two sprockets 83sl.

Chains 83c may be collapsed into skid 6 as shown in FIG. 15 by retraction of piston 239 and cylinder 240 into cylinder 241. During this "collapsing" movement it is necessary that chains 83c and cradle members 84 be prevented from tangling in such manner as to move the chains out of mesh with sprockets 83su and 83sl. The guide mechanisms for providing a controlled collapse of chains 83c includes two sets of arms 243 and 244 which are freely mounted on shaft 237. The lower ends of arms 243 and 244 serve to rotatably mount idler sprockets 245 and 246 which mesh with chains 83c. A fluid cylinder 247 is mounted on each arm 243 for pivotal movement around axis 248. Cylinder 247 is provided with a piston rod 249 which is pivotally connected with arm 244 by means of a pin 250. Rods 251 and 252 are fixedly mounted in skid 6 for supporting the lower portions of chains 83c in mesh with sprockets 83sl in the "collapsed" position.

During lowering movement of chains 83c toward the "collapsed" position (by lowering piston 239 and cylinder 240) sprockets 245 and 246 serve as guide members for directing the chain into the "orderly" arrangement shown in FIG. 15. As sprockets 245 and 246 approach the bottom of skid 39 pressure fluid is introduced into the right end of cylinder 247 to extend piston rod 249 out of the cylinder and thereby force arms 243 and 244 to diverge from one another toward their FIG. 15 lower or collapsed positions. As a result of this action chains 83c are cause to "drape" over rods 251, 252 and sprockets 245, 246 without entangling the chain links or cradles 84 and without movement of chains 83c out of mesh with sprockets 83su and 83sl.

During transport of the skids to new well site locations chains 83c may be carried within skid 6 in the FIG. 15 collapsed position. When the next well site location is reached cylinder 240 and piston rod 239 can be extended upwardly out of cylinder 241 to move chains 83c into the FIG. 10 position.

It will be noted that chains 83c carry a plurality of different size cradles 84. Each size cradle is adapted to carry a different size pipe, it being contemplated that various size casing as well as drill pipe can be accommodated in different ones of the cradles. The term "pipe" as used herein is intended to refer to casing as well as drill pipe. The design of the other mechanisms (such as the bailer, drill head and chucks) is such that the illustrated apparatus can be used to drive casing as well as pipe into the well.

Drill Collar Storage (FIG. 10)

The lowermost four hundred fifty feet of pipe in the pipe string should be of heavier construction than the superjacent pipe in order to provide a "weighted" lower end for the attainment of a truly vertical hole, it being appreciated that gravitational forces imposed on the string by the weighted lower end tend to automatically direct the string into a vertical position.

The heavier pipe are conventionally termed "drill collar." Since these drill collar must be assembled into the string first (so as to be at the bottom of the string) they should be stored as near as possible to the point of "string assembly," it being appreciated that in this way the total length of "pipe conveying" movement can be maintained at a minimum. Under the present invention these drill collar are stored in skid 39 rather than in the drill pipe skids.

There are employed thirty drill collar, each fifteen feet in length. In their stored positions (FIG. 10) the drill collars are supported on two elevators 190 which are guided and powered for vertical movement by similar mechanisms to those employed in the raising and lowering of the drill pipe elevators 80 (FIG. 12).

The drill collar is deposited from elevators 190 onto blocks 192, 193 and 194 of a shuttle mechanism carrier 191. Carrier 191 is powered for limited vertical movement by means of a fluid cylinder 195 mounted on a horizontally movable slide member 196. A fluid cylinder 197 effects movement of member 196 toward and away from vertical conveyor 83. The stroke of cylinder 197 is such that it can move the collar on blocks 192 into the appropriate cradle 84 on conveyor 83.

In order that the collar on blocks 193 be moved into the appropriate cradle 84 it is necessary that it be first transferred onto blocks 192. This is done during and after loading of the "block 192" collar into cradle 84 by actuating cylinder 195 to lower the "block 193" collar onto the innermost support member on elevator 190. Thereafter the elevator is lowered to deposit the collar on block 192 where it can be subsequently transferred to conveyor 83. In similar manner the collars above blocks 194 can be transferred onto conveyor 83 via blocks 193 and 192. The arrangement is such as to provide a relatively simple and trouble-free indexing operation. The "unloading sequence" may be changed as desired so as to vary the location of individual collars in the spring. In this way the collar "thread life" is enhanced.

*Pipe Transfer Elevator (FIGS. 16 and 17)*

When the pipe reaches the upper limit of its travel on endless vertical conveyor 83 the conveyor is stopped to permit arms 86 to pick the pipe from the conveyor and lift it into the space between jaws 88 and 89 of pipe transfer carriage mechanism 90. Each of arms 86 is received within two spaced walls 155 and 156 formed on an elevator 87. The elevator includes a horizontally disposed channel member 158 having collar structures 159 and 160 fixedly secured on its opposite ends. Collar structures 159 and 160 are mounted for slidable movement on posts 161 and 162 which are fixedly secured at their upper and lower ends in ceiling 163 and floor 164 of the upper skid 52.

Elevator 87 is moved up and down on posts 161 and 162 by means of a fluid motor 165 which is fixed mounted on ceiling 163. Motor 165 acts through speed reduction gearing 166 to rotate a gear 167 which is fixedly secured on a vertical screw 168. Screw 168 is rotatably mounted in floor 164 and ceiling 163, and threadedly meshes with a nut 169 which is fixedly secured on channel 158. The arrangement of parts is such that actuation of motor 165 causes rotation of screw 168 and vertical movement of elevator channel 87.

The intermediate portion of channel 87 fixedly carries a bracket 170, which in turn supports a fluid cylinder 171. The piston for cylinder 171 is provided with an extension in the form of a rack 173, which meshes with a gear 174 fixedly carried on an elongated shaft 175. The ends of shaft 175 rotatably extend through walls 155 and 156, and are fixedly secured to arms 151. Introduction of pressure fluid into cylinder 171 causes a reciprocation of rack 173 which rotates gear 174 and moves arms 151 between full line position 176 and dotted line position 177.

When arms 86 are in dot dash line position 177 and vertical conveyor 83 is stopped fluid motor 165 can be operated to lower elevator 87 so as to put arms 86 in a depending position extending alongside and below the uppermost pipe 178 on conveyor 83. Thereafter pressure fluid can be introduced into cylinder 171 to move arms 86 up to dotted line position 179 where it can be utilized to lift pipe 178 from conveyor 83. Reverse introduction of pressure fluid into fluid motor 165 causes screw 168 to be rotated so as to raise elevator 87 on posts 161 and 162. When elevator 87 is raised to its full line position 176 the pipe held by arms 86 is positioned in the space between jaws 88 and 89 of pipe transfer carriage mechanism 90.

*Adapter Pipe Storage Mechanism (FIG. 16)*

The design of the drilling apparatus illustrated in FIG. 25 is such that the uppermost thirty-six feet of pipe in the string must be of greater strength than the remaining pipe in the string. Accordingly there are provided two elongated high strength "adapter" pipe 180 and 181 (FIG. 16). Since these adapter pipe must always be located at the upper end of the string it is not desirable that they be shuttled through all of the mechanisms between bailer 92 and the drill pipe skids (7, 8, and 18 through 33) when the pipe string is disassembled. Instead the adapter pipe are stored in seats 182 and 183 on a carrier 184, which is slidably mounted between two support structures 185. The right end of carrier 184 is provided with two depending arms 186 which are connected to the pistons 187 of fixedly mounted fluid cylinders 188. The arrangement is such that introduction of pressure fluid into the right ends of cylinders 188 causes pistons 187 to move to the left so as to successively position pipes 180 and 181 below jaws 88 and 89 in dotted line position 189. With elevator 87 initially in a lowered position fluid motor 165 can be actuated to raise the elevator and cause arms 86 to successively pick pipe 180 and 181 off of carrier 184 and move it up into the space between jaws 88 and 89. It will be understood that arms 86 initially pick up pipe 180 and deposit it between jaws 88 and 89, after which elevator 87 is lowered to put arms 86 below the level of the remaining adapter pipe 181. After carrier 184 is indexed to the left to put pipe 181 in the 189 position elevator 87 is raised to lift pipe 181 off of carrier 184. The above movements are of course reversed to transfer the pipe from jaws 88, 89 onto carrier 184.

*Pipe Transfer Carriage Mechanism (FIGS. 16 and 18)*

Pipe transfer carriage mechanism 90 includes a horizontally elongated body 255 which is equipped with eight collars 256 though 263. These collars slidably encircle four guide rods 264 through 267. The lower guide rods 264 and 265 are fixed at their ends on stationary support structures 185 and 268. The upper guide rods 266 and 267 are fixed at their ends on stationary support structures 269 and 270. The arrangement of stationary guide rods 264 through 267 and collar structures 256 through 263 is such that body 255 is slidably supported for horizontal movements between full line position 271 (FIG. 18) and phantom line position 272.

Carriage body 255 is provided with two sets of aligned bearings 273 and 274 which serve to rotatably mount two parallel horizontal shafts 275 and 276. Each of these shafts is provided with threaded sections 277 and 278 which meshingly extend through arms 279 and 280. The lower ends of these arms carry the aforementioned jaws 88 and 89. The arms are slidably keyed on surface 281 of body 255 so as to be restricted to rectilinear movement in the arrow 282 directions (FIG. 16). Sections 277 and 278 are threaded in opposite directions so that rotation of shafts 275 and 276 in a given direction causes arms 279 and 280 (in each set of arms) to move toward one another from their FIG. 16 positions. Reverse rotation of shafts 275 and 276 causes arms 279 and 280 to return to their FIG. 16 positions.

Arms 279 and 280 serve as support structures for two sets of pipe-gripping jaws 88 and 89. By reference to FIG. 18 it will be noted that jaws 88 and 89 in each set are offset from one another in the direction of carriage movement. This "offset" arrangement of the jaws permits them to close together into overlapping positions; as a result the jaws can be used to grip relatively small diameter pipe, e.g., pipe having a one and one-half inch diameter.

Each of the jaws 88, 89 is of "V-shaped" configuration so as to provide two flat angularly related pipe-gripping surfaces 281 and 281s. The "V-shaped" construction enables the jaws to grip different diameter pipe while maintaining a constant pipe centerline. This feature is advantageous in that it allows the pipe to be accurately aligned with the jaws of bailer 92, whether the apparatus is handling relatively small diameter drill rod or large diameter well hole casing.

The mechanism for opening and closing jaws 88, 89 includes a fluid motor 283 which drives toothed shaft 284. The teeth of shaft 284 mesh with the teeth on gear 285 fixedly carried on one end of shaft 275. The other end of shaft 275 fixedly carries a sprocket 286, and the corresponding end of shaft 276 carries a second sprocket 287.

An endless chain 288 is trained around sprockets 286 and 287. The arrangement of parts is such that motor 283 drives shaft 275 via gear 285, and shaft 275 in turn drives shaft 276 via sprockets 286, 287 and chain 288. Rotation of shafts 275 and 276 opens and closes both sets of jaws 88 and 89 as previously described.

The mechanism for driving carriage body 255 between positions 271 and 272 includes an electric motor 289 which receives its current supply via a buss bar 290 extending along the length of skid 52 and a contactor 291 carried on body 255. Buss bar 290 is broken off in FIG. 18 to permit illustration of a rack 292 which is fixedly carried on skid 52. Motor 289 operates through reduction gearing to drive a pinion gear 293 which meshes with rack 292. The arrangement of parts is such that energization of motor 289 via bar 290 and contactor 291 is effective to move gear 293 along rack 292 so as to propel body 255 between positions 271 and 272. Suitable limit switches are provided on body 255 to control the direction and extent of body 255 movement.

Bailer 92 (FIGS. 19 and 20)

In its operative position bailer structure 92 is positioned above skid 49 and between the two derrick sections 67. The bailer is mounted for vertical movement on a line intersecting the line of movement of carriage mechanism 90 (FIG. 18); as a result the bailer is enabled to receive pipe from mechanism 90 for subsequent turning into vertical positions in alignment with the pipe string.

Bailer structure 92 includes a carriage member 123 which is provided with an arcuate recess 124 and a slot 125. Recess 124 is defined by a cylindrical surface 126 and two flat parallel surfaces 127 and 128. Slot 125 is defined by an end surface 129, a second end surface 130 and side wall surfaces 131 and 132. The width of slot 125 is slightly larger than the outside diameter of the largest pipe handled by the apparatus. Surfaces 129 and 130 are spaced from one another by an arcuate distance (measured from axis 94) which is slightly greater than ninety radial degrees to permit the bailer to swing pipe between horizontal and vertical positions for insertion in and removal from drill head 95.

Carriage member 123 is mounted for guided vertical movement in the space between two tracks 133 which are fixedly mounted on derrick sections 67. Member 123 is provided with two gib structures 134 which are slidably positioned in T-shaped slots 135 formed in tracks 133. Exterior surfaces of tracks 133 have secured thereon toothed racks 136, and member 123 rotatably mounts shafts 137 which carry pinion gears 138 in meshing engagement with racks 136. The arrangement of pinions 138, racks 136, tracks 133, and gibs 134 is such that member 123 is accurately guided for vertical rectilinear movement in the space between tracks 133 without any tilting or play. The bailer is moved vertically by the mechanism of piston rods 385 which extend upwardly into cylinders 386 mounted in head 95 (FIG. 24). Introduction of pressure fluid into cylinders 386 raises the bailer 92. Withdrawal of fluid from cylinders 386 allows the weight of the bailer 92 to lower it away from head 95.

Within recess 124 of member 123 there is disposed a support body 139 which is mounted for rotary movement by means of two axially aligned shafts 140. Both of these shafts are keyed onto support body 139 and are rotatably mounted in side portions of carriage member 123. One of shafts 140 is provided with a toothed section which meshes with a rack 141 formed as an extension of a piston 142. Piston 142 extends from a fluid cylinder 143. The arrangement of fluid cylinder 143, piston 142, rack 141 and the toothed section on shaft 140 is such that introduction of pressure fluid into cylinder 143 causes a reciprocation of piston 142 and a rotary movement of shafts 140 in such manner that support body 139 is rotated around axis 94 between its FIG. 19 full line position and its phantom line position 157.

Support body 139 carries a pusher member 144 which is suspended from support body 139 by means of fluid actuated pistons 145. Pistons 145 operate in fluid cylinders 146 which are fixedly secured in support body 139. The arrangement of pistons 145 and fluid cylinders 146 is such that introduction of pressure fluid into cylinders 146 causes pusher member 144 to be reciprocated in and out of body 139. Keyed onto pusher member 144 are a set of pipe-gripping jaw members 93 which are provided with cam surfaces 147. Cam surfaces 147 slidably engage cam surfaces 148 formed on pusher member 144. Pusher member 144 is provided with a plurality of recesses 149, there being one recess for each of the jaws 93. Each of the jaws 93 is provided with an outwardly extending wall portion 150 which extends into the adjacent recess 149 so as to serve as an abutment surface for a compression spring 150s. Springs 150s act to force jaws 93 into engagement with abutment members 152 which extend inwardly from support body 139. In operation of the mechanism, when pusher member 144 is forced away from support body 139 by the introduction of pressure fluid into cylinders 146 springs 150s maintain jaws 93 against abutment members 152; cam surfaces 147 remain in engagement with cam surfaces 148 so that jaws 93 are caused to automatically spread apart from one another for the reception of pipe. To accommodate the largest size casing, jaws 93 can be replaced with similar jaws having larger "jaw-spacings" and differently configured pipe-gripping surfaces.

Operation of bailer structure 92 is such that when support body 139 is in the phantom line position 157 and pusher member 144 is in the phantom line position 153 jaws 93 are opened for reception of pipe introduced from carriage 90 in the arrow 154 direction. After the pipe has been passed through the space between jaws 93 pressure fluid is introduced into cylinders 146 to draw pusher member 144 into support body 139. As pusher member 144 is drawn into member 139, its cam surfaces 148 act against cam surfaces 147 on jaws 93 as to force the jaws radially inward in such manner as to firmly grip the pipe. Thereafter the entire bailer mechanism 92 is drawn upwardly toward the drill head 95 (FIG. 27) by means of the piston-cylinder mechanism 385, 386 (FIG. 24). The introduction of pressure fluid into cylinders 386 causes piston rods 385 to be carried upwardly so as to raise bailer mechanism 92. When the pipe strikes the limit switch 440 (FIG. 18) pressure fluid is introduced into fluid cylinder 143 as to move rack 141 and rotate shafts 140 in such manner as to rotate support body 139 around axis 94. As a result of this rotatable movement the pipe is gradually transferred from a horizontal position to a vertical position where it can be introduced into the jaws of drill head 95. The sequence of operations is reversed when the bailer is utilized to transfer pipe from the drill head into carriage 90.

Pipe Sealant Applicator (FIGS. 27 and 28)

When the pipe is deposited in bailer 92 by carriage 90 its leading end strikes an abutment plate 390 which is fixedly secured on piston rod 391 of a fluid cylinder 392. A tube 393 extends within rod 391 and projects beyond plate 390 so as to extend within the pipe when said pipe is in the FIG. 27 position. Tube 393 is provided with a plurality of orifices 394 for spraying pipe sealant material (pumped from a remote source, not shown) onto the threads 395 of the pipe. After the sealant material has been sprayed onto threads 395 rod 391 is retracted into cylinder 392 to permit pipe 181 to be lifted vertically upward by head 95 and bailer 92.

Cylinder 392 is carried on a bracket 396 which is pivoted at its lower end on a slide member 397 slidably carried for horizontal movement within skid 42. The purpose of the pivotal mounting for bracket 396 is to allow the bracket to be pivoted downwardly into skid 42 preparatory to transport of the skids to new well site locations. Fluid cylinder means (not shown) may be employed to lock bracket 396 in its FIG. 27 position.

The purpose of the slidable mounting at 397 is to reposition bracket 396 and cylinder 392 in different locations in accordance with the length of pipe being handled by bailer 92. In the illustrated embodiment the adapter pipe 180 and 181 are each eighteen feet in length whereas the drill pipe and drill collar are fifteen feet in length. Slide 397 is moved about twenty inches to the right (from its FIG. 27 position) to reposition tube 393 in the correct location for spraying sealant onto the threads of drill collar and drill pipe. Slide 397 may be moved by suitable fluid cylinder means (not shown).

*Make and Break Chuck (FIGS. 25 and 26)*

The make and break chuck structure shown in FIGS. 25 and 26 includes a support structure 300 which rotatably mounts four gears 301, 302, 303 and 304 through the mechanism of shafts 305. The gears mesh with the previously described racks 136 (FIG. 20) which are fixedly positioned on the outer faces of tracks 133. Gibs 306 are fixedly secured on support structure 300 for slidable movement in tracks 133 so as to cooperate with gears 301 through 304 in the accurate guiding of structure 300 for vertical movement.

Structure 300 serves to slidably guide six piston rods 307 which slidably extend from six double acting fluid cylinders 308 (only one of the cylinders being visible in FIG. 26). These cylinders are located directly behind cylinders 309 in FIG. 25. Previously mentioned jaws 100 are mounted on the inner end portions of piston rods 307. These jaws serve to grip the upper end of a pipe 310 so as to aid in screwing said pipe onto a superjacent pipe 311 during formation of the pipe string in the well hole. Jaw portions 100 also aid in unscrewing the pipe during disassembly of the pipe string.

The upper face of support structure 300 fixedly mounts an annular bearing plate 312 which slidably engages an annular bearing plate 313 fixedly carried on the lower face of support member 314. Member 314 serves to mount the previously mentioned cylinders 309. Piston rods 315 for cylinders 309 carry jaws 99 which are adapted to grip the lower end of pipe 311 so as to cooperate with jaws 100 in the screwing and unscrewing of pipe. Removable annular inserts 325 and 326 are provided for guiding and supporting piston rods 307 and 315 and jaws 99 and 100. Jaws 99 and 100 may be replaced with jaws having differently configured jaw surfaces when it is desired to handle the larger size casing, and in such an event inserts 325 and 326 can be replaced with annular inserts having sufficient internal diameters as to accommodate the casing while still giving maximum support to the piston rods.

Support member 314 is mounted for limited horizontal rotary movement on support structure 300 by means of the previously mentioned bearing plates 312 and 313. The rotary movement is limited by six spaced pins 316 which are fixedly secured in structure 300 and extend through arcuate slots 317 in member 314. The purpose of the rotary movement of member 314 is to effect a final tightening of the pipe during the pipe-screwing operation and to effect an initial loosening of the pipe during the pipe-loosening operation.

In order to effect the rotary movement of member 314 on structure 300 there are provided the two previously mentioned fluid cylinders 103 and 104 which are mounted on wall elements 319 for pivotal movement around axis 318. Wall elements 319 are fixedly carried on structure 300. Piston rods 320 for the fluid cylinders 103 and 104 are pivotally mounted on pins 321 which fixedly extend through blocks 322 carried by member 314. The arrangement of cylinders 103, 104 and piston rods 320 is such that movement of the rods out of the cylinders effects a limited rotation of member 314 in the arrow 323 direction, and movement of the rods into the cylinders effects a limited rotation of member 314 in the arrow 324 direction.

In the operation of screwing pipe together pressure fluid is introduced into the outer ends of cylinders 308 to cause jaws 100 to firmly grip pipe 310. Initially jaws 99 are held out of gripping engagement with pipe 311. Pipe 311 is gripped by jaws 96 of drill head 95, and fluid motors 101, 102 are actuated to turn the jaws 96 in such manner as to rotate pipe 311 and cause it to thread down onto pipe 310. When pipe 311 is threaded onto pipe 310 as far as the force of motors 101, 102 will thread it fluid is introduced into the outer ends of cylinders 309 to force jaws 99 into gripping engagement with the lower end of pipe 311. While motors 101 and 102 are still actuated fluid is introduced into cylinders 103 and 104 to rotate member 314 in the same direction as pipe 311. The rotary movement of member 314 is transmitted through jaws 99 to pipe 311 so as to cooperate with the force of the motor in tightening pipe 311 onto pipe 310. The final tightening force provided by cylinders 103, 104 and motors 101, 102 is sufficient to prevent any unscrewing of the pipe in the string such as might otherwise take place by reason of string weight, inertia forces and frictional earth pressures.

In the operation of unscrewing pipe 311 from pipe 310 jaws 99 and 100 are initially forced into gripping engagement with their respective pipe. Motors 101, 102 and cylinders 103, 104 are thereafter simultaneously actuated to exert a high "loosening" torque on pipe 311. When member 314 has been rotated the short distance allowed by slots 317 the introduction of pressure fluid into cylinders 103, 104 is discontinued, and pressure fluid is redirected into the inner ends of cylinders 309 so as to withdraw jaws 99 from gripping engagement with pipe 311. Thereafter motors 101, 102 are actuated to turn pipe 311 completely off of pipe 310.

*Drill Head 95 (FIGS. 21 Through 24)*

Drill head 95 includes a supporting structure in the form of a housing 336. This housing carries two gibs 337 and four gears 338. Gibs 337 are slidably mounted within slots 135 of the aforementioned tracks 133, and gears 338 are in meshing engagement with the teeth on racks 136 so as to mount housing 336 for vertical movement in the space between derrick sections 67. Housing 336 is suspended below main cylinders 57 by means of piston rods 105, it being appreciated that introduction of pressure fluid into the lower end portions of cylinders 57 is effective to force rods 105 upward in the main cylinders so as to raise housing 336 for "pipe withdrawal" purposes.

Housing 336 is internally contoured to provide an annular shoulder 339 on which is secured an annular track element 340. A second track element 341 is secured on an internal body member 342, and conical rollers 343 are positioned between tracks 340 and 341 to support body member 342 for rotary movement around the vertical axis of the drill head. Body member 342 is powered for rotary movement by two fluid motors 101 and 102 which operate together to drive a shaft 345. This shaft carries a worm gear 346 which meshes with a large diameter gear 347 secured on member 342. Member 342 serves as a carrier mechanism for internal housing element 348. Element 348 includes a relatively large diameter shell 349 and a relatively small diameter sleeve portion 350 which is rigidly secured on an elongated collar or tube 351. It will be understood that actuation of fluid motors 101 and 102 is effective to rotate the entire assembly of mechanisms 342, 341, 349, 350 and 351.

The central opening 352 in tube 351 serves as a passage for drilling mud, it being understood that this mud is pumped down into the pipe string to lubricate the drill bit, carry off the cuttings and act as a hydraulic column for opposing the force of a possible blowout. The upper end portion of tube 351 extends into a fitting 353 which is fixedly mounted above a cover plate 354 carried by housing 336. Packing 360 prevents escape of mud out through the joint between elements 351 and 353. Plate 354 is provided with an annular flange 355 which mounts the outer races 356 of a roller bearing assembly 357. The inner races of assembly 357 are carried by member 342.

Fitting 353 is internally threaded at 358 for reception of conduit leading from the mud pumps carried on skids 12 and 13 (FIG. 4). Opening 359 in fitting 353 is normally closed by a valve mechanism (not shown). This valve mechanism can be opened to permit the lowering of logging mechanisms down into the well hole.

The lower end portion of tube 351 is internally recessed to provide an annular shoulder which mounts a resilient washer 362. This washer cooperates with packing 361 to sealingly engage the uppermost pipe 180 in the pipe string so as to prevent any leak in the flow of mud into the string.

The uppermost pipe 180 in the string is held in head 95 by the aforementioned jaws 96 which are provided with pipe-gripping buttons 363. The outer faces 364 of jaws 96 cammingly engage against cam surfaces 365 of an annular pusher member 366. Jaws 96 are slidably keyed onto member 366, and member 366 is in turn slidably keyed on the inner face of shell 349; as a result rotary movement of shell 349 by motors 101, 102 is effective to rotate jaws 96.

The upper ends of jaws 96 carry arm portions 367 which extend into slots 368 in member 366. Arm portions 367 serve as abutment elements for compression springs 369 which are seated in slots 368. These springs 369 bias jaws 96 into continuous engagement with an annular stop element 370 carried by shell 349. For handling large size pipe and casing, jaws 96 can be replaced with similar jaws having larger "jaw-spacings" differently configured buttons 363.

In order to move jaws 96 radially in and out so as to grip and release the pipe string there is provided an annular thrust plate 371 which is carried on the lower ends of piston rods 372. These rods 372 are connected at their upper ends to pistons 373 (FIG. 24) which are slidably housed in fluid cylinders 374 mounted in drill head housing 336. Introduction of pressure fluid into cylinders 374 via ports 375 lifts rods 372 so as to raise plate 371 toward housing 336. Plate 371 carries an annular track element 376 which is positioned below an annular track element 377 carried by member 366. Conical rollers 378 are rollably mounted in the two tracks so as to permit rotation of member 366 without rotation of plate 371, it being appreciated that piston rods 372 prevent any rotative movement between plate 371 and non-rotatable housing 336. An annular retainer ring 379 prevents any axial separation of member 366 away from plate 371.

In operation, when pistons 373 are positioned adjacent the lower ends of cylinders 374, plate 371 is lowered to draw member 366 downwardly in shell 349; cam surfaces 365 are thereby moved downwardly to permit an outward radial movement of jaws 96 for permitting insertion of pipe into the drill head. Introduction of pressure fluid into cylinders 374 lifts pistons 373 so as to elevate plate 371; as a result member 366 is raised so as to act through cam surfaces 365 and 364 to force jaws 96 radially inward for firmly gripping adapter pipe 180.

When head 95 is used to thread one pipe onto another it is necessary that the pipe being threaded together have a relative movement with respect to one another according to the longitudinaly movement which takes place during the "threading" or "screwing" operation. In the illustrated embodiment this relative movement is accomplished by holding the lower pipe stationary and allowing the uppermost pipe to have a slight downward movement with its threads riding along the lower pipe threads during the "screwing" operation. The mechanism for effecting this slight downward movement includes a set of slide members 380 mounted for vertical movement in slots 381 in jaws 96. Compression springs 382 bias members 380 upwardly to their FIG. 22 positions so as to provide a relatively smooth threading action.

In operation, when it is desired to thread one pipe onto another the lower pipe is gripped at its upper end by jaws 100 (FIG. 26), and the upper pipe is inserted into head 95 by bailer 92 (FIG. 19). The upper pipe is not inserted into abutting engagement with washer 362 (FIG. 22) but is only inserted far enough into head 95 to be gripped by buttons 383 on slide members 380. After pistons 373 have been lifted to cause buttons 383 to grip the upper pipe, motors 101 and 102 are actuated to rotate jaws 96 so as to turn the upper pipe onto the lower pipe threads. During this threading movement jaws 96 maintain their vertical positions (i.e. they do not move either up or down). However slide members 380 are shorter than slots 381 so that they can slide downwardly in accordance with the threading motion. The upper pipe is supported on the subjacent pipe, and slide members 380 move down with the upper pipe. During the "unthreading" operation members 380 have a reverse movement relative to jaws 96.

It will be noted from FIG. 22 that, while mechanisms 342, 348 and 351 are rigidly connected together for unitary movement, yet these mechanisms can be easily disassembled from one another and removed from housing 336 through its upper and lower ends. Thus, cover plate 354 can be removed from housing 336, after which bolts 384 can be turned out to permit separation of housing members 342 and 348 from one another. Member 342 can be removed through the upper end of housing 336, and member 348 can be removed through the lower end thereof. The design of the various mechanisms is such that the operative components can be removed for replacement purposes without sacrifice in the number of bearing mechanisms employed, it being noted that bearing assemblies 343, 357 and 385 are effective to rotatably support the jaw mechanism against the realtively high loads imposed by the pipe string.

*Pipe String Assembly, Sequence of Movements (FIG. 27)*

FIG. 27 is taken with the lowermost adapter pipe 180 already screwed into the uppermost pipe 400s in the pipe string. The joint between pipe 180 and pipe 400s is indicated at 400. The second adapter pipe 181 is shown in the various positions it occupies during its assembly into the pipe string, it being appreciated that both of pipes 180 and 181 must be incorporated into the string before drilling operations begin.

In its full line position 401, pipe 181 projects through bailer 92, having been initially put in this position by movement of carriage 90 to the phantom line position 272 (FIG. 18). When pipe 181 is introduced into bailer 92 head 95 occupies its full line position 403.

After carriage 90 has been retracted to its full line position 271 (FIG. 18) and pressure sealant tube 393 has been retracted out of pipe 181, the jaws on bailer 92 are closed (by cylinders 146–FIG. 19) and the bailer and head 95 are lifted upwardly by the introduction of pressure fluid into cylinders 57.

When pipe 181 reaches its phantom line position 402 pressure fluid is introduced into cylinder 143 (FIG. 20) so as to pivot body 139 about axis 94. As a result pipe 181 begins to rotate around axis 94 while simultaneously being carried upward with head 95 and boiler 92. During this combined "rotary-translatory" movement of pipe 181 its right end takes the path indicated by dotted line 404.

When head 95 reaches its dotted line position 405 pipe 181 occupies its vertical phantom line position 406. Subsequent introduction of pressure fluid into cylinders 386 (FIG. 24) causes bailer 92 to move upwardly toward head 94 so as to put the upper end of pipe 181 between buttons 383 on jaws 96 (FIG. 22). Jaws 96 are then closed on the pipe and jaws 93 (FIG. 19) are opened.

When pipe 181 was initially received into bailer 92 from carriage 90, pipe 180 was being gripped by the jaws of chuck 97 fixedly mounted in skid 36. The detailed construction of chuck 97 is very similar to that of body 139 in that a force member 407 is operated by piston rods 408 to open and close the chuck jaws via a cam mechanism similar to mechanism 144 shown in FIG. 19. The chuck could take several forms, it being merely necessary that the chuck include power-operated mechanism for opening and closing its jaws.

Make and break chuck 98 is mounted on two piston-cylinder mechanism (not shown) for vertical movement between full line position 409 and dotted line position 410. The cylinders are preferably mounted alongside of support chuck 97, and the piston rods are preferably connected at their upper ends to chuck 98. The operation of chuck 98 is such that while head 95 is being moved upwardly from its full line position 403 to its dotted line position 405 make and break chuck 98 is being moved upwardly from its full line position 409 toward its dotted line position 410. During this movement both sets of jaws 99 and 100 (FIG. 26) are opened, pipe 180 (and the subjacent pipe) being supported by chuck 97. The upward movement of chuck 98 is of course delayed sufficiently to permit passage of the lower end of pipe 181 along path 404.

When make and break chuck 98 is in position 410 its jaws 100 are closed onto pipe 180 and head 95 is lowered slightly from position 405 so as to place the lower male threaded end of pipe 181 onto the upper female threaded end of pipe 180. Before the threads begin to mesh motors 101 and 102 are started so as to rotate pipe 180. When the threads mesh the floating mount at 380 (FIG. 22) allows the upper pipe to easily thread onto the lower pipe. After the threads are snug on one another cylinders 309, 103 and 104 are sequentially actuated to tighten the fit in the manner previously described in connection with the detailed description of chuck 98.

After pipe 181 has been fully threaded onto pipe 180 chuck 97 is caused to grip the pipe string, and head 95 is moved downwardly to put pipe 180 into the space between buttons 363. When jaws 96 are again closed, head 95 is moved downwardly so as to effect a well drilling operation. During the drilling operation it will be appreciated that piston rods 344 partially support the pipe string weight so as to maintain a satisfactory operating pressure on the drilling bit, and motors 101 and 102 serve to rotate the pipe string in the well hole.

After the well hole has been lengthened by one drill pipe length (fifteen feet) it is necessary to add another drill pipe to the string. This is effected by sequentially removing adapter pipe 180 and 181, temporarily storing them in carrier 184 (FIG. 16), assembling a new pipe into the string, and sequentially replacing the two adapter pipes into their FIG. 21 positions. The drill pipes are slightly shorter than the adapter pipe, and the movement distances of the operative mechanisms are slightly altered during the assembly of drill pipe into the string; however the assembly sequence of movements is the same as that previously described in connection with pipe 181. It should be noted that while each pipe is being assembled into the string another pipe is being conveyed into carriage; as a result pipe can be assembled into the string immediately after one another. With the illustrated apparatus the assembly time for each pipe is approximately twenty seconds.

*General Summary of Operations*

The illustrated apparatus is such that the various different component mechanism are housed in separate skid structures. These skid structures can be individually transported to new well site locations on separate trucks.

At the new well site the various skids can be moved into their FIG. 1 positions, after which the various pipe-handling mechanisms can be operatively connected together in a comparatively short period of time.

In its operative position the apparatus stores drill pipe in the various pipe skids and shuttles it into and out of the pipe string via conveyors 81, 82, 83, elevator 87, carriage 90, bailer 92, head 95, and chucks 97, 98. The arrangement is such as to reduce manpower requirements to a minimum.

The separation of the various mechanisms into individual skids enables them to be constructed as relatively heavy high strength structures. As a result the mechanisms are subject to minimum "down time" for repair and replacement purposes.

The combination of disclosed features is such as to enable the drilling of deep wells at minimum cost per foot of well length.

In the foregoing description, it will be understood that the synchronization of the various elements making up the system are governed by interconnected sensing devices such as limit switches well known in the art. Thus, automatic operation is well within the realm of the invention.

We claim:

1. Well drilling apparatus comprising five elongated skids in aligned abutting relation with each other along their longitudinal axes; slide structures carried on the endmost skids for longitudinal movement therealong; derrick superstructure and fluid cylinder means pivotally connected thereto carried by each of said slide structures; slide members carried by the next innermost skids for longitudinal movement therealong; derrick sections hingedly carried by said slide members; and mating fastener means carried by the adjacent derrick superstructures and derrick sections; whereby the slide structures can be moved toward the slide members to position the derrick structures against the derrick sections, after which the slide members can can be moved from said next innermost skids onto the middle skid and the derrick sections pivoted upwardly about their hinge axes to upright operative positions wherein the derrick superstructures positioned against one another.

2. Well drilling apparatus comprising base skids, five aligned skids in end-to-end abutting relation over said base skids; slide structures carried on the endmost skids for movement toward the next innermost skids; derrick superstructures removably carried on the slide structure; slide members carried by the next innermost skids for movement toward the center skid; derrick base sections hingedly carried by said slide members; and means for fastening said derrick superstructures of said derrick base sections, whereby the slide structures can be moved toward the slide members to permit securement of the derrick superstructures on the derrick sections; and fluid cylinder means carried by said base skids of detachable connection with the derrick sections to raise said sections about their hinge axes to operable position.

3. Well drilling apparatus comprising five aligned skids in end-to-end abutting relation; slide structures carried on the endmost skids for movement toward the next innermost skids; derrick superstructures removably carried on the slide structures; slide members carried by the next innermost skids for movement toward the center skid; derrick sections hingedly carried by said slide members; and means for fastening said derrick superstructures to said derrick sections, whereby the slide structures can be moved toward the slide members to permit securement of the derrick superstructures on the derrick sections; sixth and seventh skids positioned below said next innermost skids; and fluid cylinder means carried by said sixth and seventh skids; said fluid cylinder means having connector portions for releasable attachment on the derrick sections, whereby said fluid cylinder means can raise and lower the derrick sections about their hinge axes.

4. Well drilling apparatus comprising five aligned skids in end-to-end abutting relation; slide structures carried on the endmost skids for movement toward the next innermost skids; derrick superstructures removably carried on the slide structures; slide members carried by the next innermost skids for movement onto the center skid; derrick sections hingedly carried by said slide members; and means for fastening said derrick superstructures to said derrick sections, whereby the slide structures can be moved toward the slide members to permit securement of the derrick superstructures on the derrick sections; a drill head positioned on the center skid, and said head and derrick sections having mating guide surfaces; whereby said slide members can be moved onto the center skid and the derrick sections pivoted upwardly about their hinge axes, after which the drill head can be guided for vertical movement between the derrick sections.

5. Well drilling apparatus comprising three aligned skids in end-to-end abutting relation; slide members carried on the endmost skids for movement onto the center skid; and derrick sections hingedly carried by said slide members; whereby the slide members can be moved onto the center skid to put the ends of the derrick sections adjacent one another, after which the derrick sections can be pivoted upwardly about their hinge axes into vertical, operative positions.

6. Well drilling apparatus comprising a support structure; a vertically movable drill head; fluid cylinder means mounted on said support structure and connected with the head for effecting its vertical movement; a bailer positioned below said drill head; second fluid cylinder means connecting the bailer with the head; a make and break chuck positioned below said bailer; said bailer including a set of jaws mounted for pivotal movement around a horizontal axis whereby to grasp a horizontally positioned pipe and pivot it into a vertical position between the drill head and chuck, actuation of the second fluid cylinder means serving to raise the bailer toward the head so as to insert the pipe into said head; said head having rotary mechanism therein for grasping the inserted pipe; said make and break chuck having first mechanism therein for releasably gripping the uppermost pipe in a string of pipe, second mechanism therein for releasably gripping the aforementioned vertical pipe, and power means for rotating said second mechanism relative to said first mechanism; whereby, when the opposite ends of the first pipe are positioned in the drill head rotary mechanism and chuck the drill head rotary mechanism can be rotated to turn the vertical pipe onto the pipe string, after which the second gripping mechanism in the chuck can be moved to grip the vertical pipe and the power means actuated to tighten the connection between said vertical pipe and pipe string.

7. In well drilling apparatus,
storage mechanism for supporting pipe sections in vertically spaced horizontal rows,
a derrick,
a drill head carried by said derrick for vertical movement,
means for moving said drill head,
said drill head including a rotatable pipe gripping chuck,
a pipe bailer carried in said derrick for vertical movement beneath said drill head,
means for moving said bailer relative to said drill head,
said bailer including a set of pivotable jaws for gripping a horizontally disposed pipe section and indexing it to a position in alignment with said drill head chuck,
means for moving pipe from said storage mechanism into said bailer in a horizontal position,
a make-and-break chuck carried by said derrick for vertical movement below said bailer,
means for moving said make-and-break chuck,
said make-and-break chuck including a set of rotatable jaws for gripping the lower end of a pipe section carried by said drill head and said make-and-break chuck also including means for gripping the top end of a drill string against rotation, whereby said drill head can be moved toward the drill string so that the chuck thereof can turn a pipe section into the top of the drilling string to start a pipe joint between the pipe section and string and said make-and-break chuck rotatable jaws can complete the joint.

8. In well drilling apparatus,
a first skid,
second and third skids positioned at right angle to said first skid,
an elevator carried by said second skid,
a horizontally disposed deck of pipe supported on said elevator,
a horizontally movable conveyor on said second skid to receive pipe from said elevator,
a fourth skid positioned atop said third skid,
a vertical conveyor running through said third and said fourth skids,
means for transferring pipe from said horizontal conveyor onto said vertical conveyor,
a fifth skid atop said fourth skid,
a horizontal carrier on said fifth skid movable toward the vertical centerline of said first skid,
means on said fifth skid for moving pipe from said vertical conveyor to said carrier,
a derrick supporting a drill head for vertical movement above said first skid,
means for moving said drill head,
a bailer carried by said derrick for vertical movement beneath said drill head,
means supporting said bailer from said drill head for movement into horizontal registry with said carrier,
and said bailer including pipe gripping means mounted for pivotal movement, whereby said carrier can be moved toward said bailer to deposit pipe in said gripping means and the bailer pivot the pipe to a vertical position for movement into engagement with said drill head.

9. In well drilling apparatus,
a derrick,
a drill head carried by said derrick for vertical movement and including a rotatable chuck,
means for moving said drill head,
a bailer carried by said derrick for vertical movement beneath said drill head,
said bailer including a set of jaws mounted for rotary movement about a horizontal axis,
means suspending said bailer from said drill head for movement relative to said drill head,
a pipe section elevator including means for supporting a pipe section in a horizontal position,
a horizontal conveyor for receiving a pipe section from said elevator and moving the same horizontally,
a vertical conveyor to move a pipe section vertically,
a shuttle for transferring a pipe section from said horizontal conveyor to said vertical conveyor,
a carrier mounted for horizontal movement toward and away from the vertical axis of said drill head,
and power operated means for transferring a pipe section from said vertical conveyor to said carrier, whereby said carrier can be moved toward said bailer to place a section of pipe in said bailer jaws to be indexed from horizontal to vertical position and then moved vertically for engagement with said drill head chuck.

10. In well drilling apparatus,
a derrick,
a drill head mounted on said derrick for vertical movement,
means for moving said drill head,
a bailer mounted on said derrick for vertical movement beneath said drill head,
means supporting said bailer from said drill head for said vertical movement and thus for movement relative to said drill head,
said bailer including a set of pipe-gripping jaws mounted for pivotal movement between horizontal and vertical,
a carrier mounted for horizontal movement relative to said bailer to move a pipe section horizontally into said bailer jaws,
means for pivoting said bailer jaws to index a pipe section from horizontal to vertical for movement by said bailer toward said drill head,
a make-and-break chuck mounted on said derrick for vertical movement beneath said bailer,
means for moving said make-and-break chuck,
and said make-and-break chuck including an upper set of power rotated, pipe gripping jaws,
and a lower set of radially movable, pipe-gripping jaws,
said lower jaws serving to grip the top end of a pipe string and the upper jaws to grip the lower end of a drill head carried pipe, whereby said drill head can rotate a pipe into a string held by said lower jaws and the upper jaws subsequently grip the section and complete the joint.

11. In well drilling apparatus,
a derrick,
a drill head carried by said derrick for lineal movement thereon,
means for moving said drill head,
said drill head including rotatable pipe gripping jaw means to grip and rotate a pipe section,
and a make-and-break chuck carried by said derrick beneath said drill head for coaxial lineal movement only relative to said drill head,
said make-and-break chuck including an annular body having an axial bore,
a conical guide carried coaxially at the top of said bore to direct the lower end of a pipe section held by said drill head into said make-and-break chuck,
a rotatable annular jaw support positioned coaxially beneath said guide and forming part of said bore,
an upper set of radially movable jaws in said rotatable support to grip the bottom end of a pipe section carried by said drill head,
a lower set of radially movable but non-rotatable jaws in said body and extensible into said bore to grip the top end of a pipe string against rotation while being joined to the drill head carried section,
and means for rotating said support and said upper jaws to make and break a joint between the section and string.

12. In earth drilling apparatus,
a base,
a derrick positioned on said base, a platform carried by said derrick in spaced relation above the surface of the earth,
a fluid cylinder connected to said platform,
a drill head carried by said derrick for guided vertical movement,
said cylinder being connected to said drill head to move said drill head vertically,
a rotatable chuck within said drill head to connect to a pipe section,
a make-and-break chuck carried by said derrick for aligned vertical movement beneath said drill head,
a bailer for positioning a pipe section in aligned relation between said drill head and said make-and-break chuck,
and said make-and-break chuck including an annular body,
an annular pipe guide at the top of said body,
a rotatable jaw carrier beneath said guide within said body,
an upper set of radially movable jaws within said carrier to grip the bottom end and turn a pipe section carried by said drill head,
means for rotating said carrier,
and a lower set of radially movable jaws to grip the top end of a pipe string against rotation.

13. In drilling apparatus including a derrick carrying a drill head for lineal movement and the drill head having a chuck for connection to a pipe section to move the same in a well hole, the improvement of
a make-and-break chuck including an annular body having guide means thereon for lineal movement on the derrick,
an axially extending bore through said body,
an annular pipe guide at the top of said bore,
an annular rotatable carrier beneath said guide in said housing and forming part of said bore, a set of lineally, radially movable pipe-gripping jaws within said carrier,
means for rotating said carrier and said jaws to make and break a pipe joint,
and a set of radially movable jaws within said body to grip a pipe section against rotation.

14. In automatic earth drilling apparatus,
a derrick,
a drill head carried by said derrick for movement along a drilling axis,
said drill head including a chuck to grasp and rotate a pipe coaxially on said drilling axis,
means for moving said drill head,
a pipe bailer carried by said derrick for movement along said drilling axis,
means for moving said bailer,
said bailer including a set of jaws pivotable about a horizontal axis running through said drilling axis to index a pipe section from horizontal to vertical by rotation about a point intermediate its ends,
and a make-and-break chuck having an axial bore and supported beneath said bailer for movement along said drilling axis to receive pipe in said bore to make and break a joint in a pipe string.

15. In automatic earth drilling apparatus,
a derrick,
a drill head carried by said derrick for movement along a drilling axis,
said drill head including a chuck to grasp and rotate a pipe coaxial on said drilling axis,
means for moving said drill head,
a make and break chuck spaced from said drill head and supported for movement on said derrick along said drilling axis to make and break a pipe joint,
means for moving said make-and-break chuck,
means for positioning a pipe section horizontally across said drilling axis,
and means carried by said derrick for pivoting a pipe section about a horizontal axis running through said drilling axis to index a pipe section from horizontal to vertical.

16. In drilling apparatus including a derrick carrying a drill head for lineal movement along a well axis and the drill head having a chuck for connection to a pipe string to move the same in the well, the improvement of
a make-and-break chuck including an annular body,
an axially extending bore through said body,
means for moving said body coaxially along the well axis,
an annular guide at the top of said opening,
two axially spaced sets of jaws radially movable in said bore to grip adjacent pipe sections,
and means for rotating one of said sets of jaws to make and break a pipe joint.

17. Well drilling apparatus comprising,
first elongated skid means,
derrick means supported on said skid means,
drill pipe-support mechanism carried by said derrick means and having a vertical axis,
second elongated skid means including a plurality of parallel, elongated skids arranged at right angles to the longitudinal axis of said first skid means,
said parallel skids including a conveyor skid means having a longitudinal axis and with said longitudinal axis intersecting the vertical axis of the drill pipe-supporting mechanism,
a vertical conveyor within the conveyor skid means,
said parallel skids also including at least one pipe skid positioned alongside the conveyor skid means so that pipe may be supported therein in horizontal positions extending parallel to the pipe skid longitudinal axis,
means for shifting pipe from the pipe skid laterally onto the conveyor in the conveyor skid means,
means for shifting pipe axially from the conveyor into vertical registry with the pipe-support mechanism,
and means for turning the pipe into a vertical position in aligned relationship to the support mechanism.

18. Well drilling apparatus comprising,
five aligned skids in end-to-end abutting relation,
slide structures carried on the endmost skids for movement toward the next innermost skids,
derrick superstructures removably carried on each of said slide structures,
slide members carried by the next innermost skids for movement toward the center skid,
derrick base sections hingedly carried by said slide members,
and means for fastening said derrick superstructures to said derrick base sections and to one another, whereby when the slide structures are moved toward the slide members and the derrick superstructures fastened onto the derrick base sections, the slide members can be moved toward the center skids and the derrick sections pivoted upwardly about their hinge axes to operative positions wherein the derrick superstructures can be fastened together to form an operable derrick.

References Cited by the Examiner
UNITED STATES PATENTS

| | | | |
|---|---|---|---|
| 683,039 | 9/01 | Hagen | 198—102 |
| 1,199,818 | 10/16 | Peck | 198—102 |
| 1,967,517 | 7/34 | Rogers | 175—57 |
| 2,054,223 | 9/36 | LeBus | 173—164 |
| 2,221,067 | 11/40 | Wilson | 189—16 |
| 2,240,852 | 5/41 | Moon | 189—15 |
| 2,263,267 | 11/41 | Franklin | 81—53.6 |
| 2,276,016 | 3/42 | Brantly | 173—152 |
| 2,403,994 | 7/46 | Paynter | 118—317 |
| 2,615,681 | 10/52 | True | 166—77.5 |
| 2,642,034 | 6/53 | Griffin et al. | 118—317 |
| 2,656,052 | 10/53 | Tucker | 214—2.5 |
| 2,657,014 | 10/53 | Webster | 81—53.6 |
| 2,690,846 | 10/54 | Putnam | 214—2.5 |
| 2,706,539 | 4/55 | Woolslayer et al. | 189—15 |
| 2,739,790 | 3/56 | Ball | 175—199 |
| 2,760,392 | 8/56 | Paget | 81—53 |
| 2,784,626 | 3/57 | Paget | 81—53 |
| 2,803,434 | 8/57 | Heinish | 173—40 |
| 2,810,551 | 10/57 | Long | 24—263 |
| 2,817,495 | 12/57 | Pearl | 173—23 |
| 2,834,575 | 5/58 | Hughes | 74—661 |
| 2,848,196 | 8/58 | Simmonds | 175—52 |
| 3,002,560 | 10/61 | Paget | 175—85 XR |

CHARLES E. O'CONNEL, *Primary Examiner.*
BENJAMIN BENDETT, WALTER BERLOWITZ,
*Examiners.*